US006708239B1

(12) United States Patent
Ellerbrock et al.

(10) Patent No.: US 6,708,239 B1
(45) Date of Patent: Mar. 16, 2004

(54) NETWORK DEVICE INTERFACE FOR DIGITALLY INTERFACING DATA CHANNELS TO A CONTROLLER VIA A NETWORK

(75) Inventors: Philip J. Ellerbrock, Bridgeton, MO (US); Robert L. Grant, St. Peters, MO (US); Daniel W. Konz, Hazelwood, MO (US); Joseph P. Winkelmann, St. Peters, MO (US)

(73) Assignee: The Boeing Company, Seattle, WA (US)

( * ) Notice: Subject to any disclaimer, the term of this patent is extended or adjusted under 35 U.S.C. 154(b) by 479 days.

(21) Appl. No.: 09/735,146

(22) Filed: Dec. 12, 2000

Related U.S. Application Data

(60) Provisional application No. 60/254,136, filed on Dec. 8, 2000.

(51) Int. Cl.$^7$ ................................................ G06F 13/38
(52) U.S. Cl. ............................ 710/62; 710/69; 710/72
(58) Field of Search ............................ 710/21, 25, 53, 710/62, 72, 69; 700/286, 292, 22; 709/201, 238

(56) References Cited

U.S. PATENT DOCUMENTS

| 4,137,562 A | * | 1/1979 | Boeck et al. | .................. 710/53 |
| 4,304,001 A | | 12/1981 | Cope | |
| 4,688,168 A | | 8/1987 | Gudaitis et al. | |

(List continued on next page.)

FOREIGN PATENT DOCUMENTS

| EP | 0 449 458 A1 | 10/1991 |
| WO | WO 99/63409 | 12/1999 |

OTHER PUBLICATIONS

Infineon: *C167CR 16–BIT Single–Chip Microcontroller*; Apr. 2000; 72 pages; XP–002201995; Published by Infineon Technologies AG.
Tobias Wenzel; Infineon: *CAN Baudrate Detection with Infineon CAN Devices*; Jul. 1999, 11 pages; XP–002201996.
PCT Notification of Transmittal of the International Search Report, PCT International Search Report for PCT/US02/13190 (filed Apr. 26, 2002).
PCT Notification of Transmittal of the International Search Report, PCT International Search Report for PCT/US02/13246 (filed Apr. 26, 2002).
PCT Notification of Transmittal of the International Search Report, PCT International Search for PCT/US02/13303 (Field Apr. 26, 2002).

(List continued on next page.)

*Primary Examiner*—Khanh Dang
(74) *Attorney, Agent, or Firm*—Alston & Bird LLP

(57) ABSTRACT

The present invention provides a network device interface and method for digitally connecting a plurality of data channels, such as sensors, actuators, and subsystems, to a controller using a network bus. The network device interface interprets commands and data received from the controller and polls the data channels in accordance with these commands. Specifically, the network device interface receives digital commands and data from the controller, and based on these commands and data, communicates with the data channels to either retrieve data in the case of a sensor or send data to activate an actuator. Data retrieved from the sensor is then converted by the network device interface into digital signals and transmitted back to the controller. In one advantageous embodiment, the network device interface uses a specialized protocol for communicating across the network bus that uses a low-level instruction set and has low overhead for data communication.

17 Claims, 13 Drawing Sheets

U.S. PATENT DOCUMENTS

| | | |
|---|---|---|
| 4,942,571 A | 7/1990 | Moller et al. |
| 4,969,147 A | 11/1990 | Markkula, Jr. et al. |
| 5,138,709 A | 8/1992 | Jones et al. |
| 5,251,208 A | 10/1993 | Canniff et al. |
| 5,274,783 A | 12/1993 | House et al. |
| 5,367,678 A | 11/1994 | Lee et al. |
| 5,445,128 A | 8/1995 | Letang et al. |
| 5,615,404 A | 3/1997 | Knoll et al. |
| 5,623,610 A | 4/1997 | Knoll et al. |
| 5,694,555 A | 12/1997 | Morriss et al. |
| 5,742,847 A | 4/1998 | Knoll et al. |
| 5,815,516 A | 9/1998 | Aaker et al. |
| 5,909,556 A | 6/1999 | Morriss et al. |
| 5,946,215 A | 8/1999 | Mito |
| 5,978,875 A | 11/1999 | Asano et al. |
| 6,013,108 A * | 1/2000 | Karolys et al. ............. 702/189 |
| 6,115,713 A * | 9/2000 | Pascucci et al. ............... 707/10 |
| 6,195,724 B1 | 2/2001 | Stracovsky et al. |
| 6,273,771 B1 | 8/2001 | Buckley et al. |
| 6,600,972 B2 * | 7/2003 | Morrison et al. ........... 700/286 |

OTHER PUBLICATIONS

PCT Notification of Transmittal of the International Search Report; PCT International Search Report for PCT/US02/13366.

PCT Notification of Transmittal of the International Search Report, PCT International Search Report for PCT/US02/13367 (Filed Apr. 26, 2002).

PCT Communication Relating to the Results of the Partial International Search for PCT/US/01/47393.

* cited by examiner

NETWORK DEVICE INTERFACE FOR DIGITALLY INTERFACING DATA CHANNELS TO A CONTROLLER VIA A NETWORK

CROSS-REFERENCE TO RELATED APPLICATIONS

The present application claims priority from U.S. Provisional Patent Application Ser. No. 60/254,136, entitled: NETWORK DEVICE INTERFACE FOR DIGITALLY INTERFACING DATA CHANNELS TO A CONTROLLER VIA A NETWORK filed on Dec. 8, 2000, the contents of which are incorporated herein by reference.

FEDERALLY SPONSORED RESEARCH OR DEVELOPMENT

This invention was made with government support under Cooperative Agreement No. NCCW-0076 awarded by NASA. The government has certain rights in this invention.

FIELD OF THE INVENTION

The present invention relates generally to network device interface and, more particularly, to an apparatus and method for digitally interfacing data channels with a controller over a common network bus.

BACKGROUND OF THE INVENTION

In many industries today, monitoring systems are used to assess either possible system failures or the affects of environment and other external forces on an object of interest. For example, in the avionics industry, monitoring systems are employed to monitor parameters, such as strains, acceleration, pressures, corrosion, and temperatures at various critical structural locations on aircraft. Similarly, such monitoring systems could be used in the automobile industry to control and monitor everything from on/off occupant controls to drive-train controls and multimedia systems.

Many of these conventional monitoring systems use a plurality of remote devices, such as sensors, actuators, and subsystems that are placed about the object being monitored at the critical locations. Further, many of these conventional monitoring systems include either one or several controllers connected to each of the remote devices for receiving data from the remote devices and sending commands to the remote devices. During operation, the controllers acquire data from the various sensors. The controllers also activate the actuators to perform functions on the object.

Although these conventional monitoring systems provide a way to monitor critical structures of an object, they do have some drawbacks. For example, many of the conventional monitoring systems use dedicated wiring and signal conditioning to connect each of the remote devices to the controller. Additionally, many of the remote devices are typically analog, and data received from the remote devices is typically in analog form.

In many industries today, including the avionics and automotive industries, the complexity of the network may make many conventional monitoring systems impractical for a number of reasons. Specifically, the dedicated wiring and signal conditioning can be expensive, bulky, heavy and hard to install and maintain. This is especially critical in aircraft applications, where weight and size concerns are at the forefront. Further, in the automotive industry, the added wiring may add weight and cost to the car.

Additionally, as stated, many conventional monitoring systems transmit data in an analog format. Typically, analog signals are susceptible to noise introduced into the signals during data transmission. Given that many of the transmitted signals have a low amplitude to start with, this noise can corrupt the signal and decrease the signal to noise ratio levels that cause loss of resolution in the signal. Further, as many of these remote devices are scattered a fair distance from the controller, the electrical lines connecting the remote devices to the controller may be sufficiently long to cause signal degradation due to DC resistance in the wiring.

In light of this, it would be advantageous to replace the dedicated wiring and the analog transmission with a common bus and use digital transmission of data. But, many conventional digital networks suffer from a variety of problems themselves. For example, many existing digital networks demand complicated protocols requiring processors and, thus, forcing unacceptably large or costly remote devices. Processor based sensing devices may also have problems taking samples of analog data, or causing an actuator to take an action, at exactly the right time. Complicated protocols also introduce overhead into the messages on the bus that are not necessary for data acquisition and control. This overhead can severely limit the number of data samples that can be transmitted on the bus. These networks also have other problems. For example, they generally do not support both acquisition and control, and they typically only support short network lengths. Further, these conventional networks typically have bulky network device interfaces, slow network data rates, or a low network device count. Additionally, many computer systems that include digital networks do not operate in a time-deterministic manner. These computer systems generally lack the capability to schedule a trigger command to the network components that repeats or is interpreted and executed with any precision timing.

In light of the foregoing, it would be advantageous to provide a network system that allows network components to digitally communicate over an inexpensive, simple and high-speed, yet robust, network line with a simple, low overhead message protocol, small component size and low wire count. The network system would also advantageously operate without the use of a microcontroller or processor for the network devices. Also, the network system would support both acquisition and control, and be capable of acquiring or converting data simultaneously from the networked components. Further, the network system would allow for high component counts, longer network lines and insure time determinism in a precise manner.

SUMMARY OF THE INVENTION

A brief definition of network objects here is necessary to understand and avoid confusion in this specification. The first network object to be defined is the bus controller. The bus controller is network device that sends commands on the network bus. All other devices on the network listen to the bus controller and take actions based on the commands of the bus controller. A network device is any device on the network that is not a bus controller. A network device is often referred to as a remote device throughout this disclosure. A Network Device Interface (NDI) is a component of a network device. An NDI listens to the bus controller and any other traffic on the bus, and depending on the traffic on the network bus, performs an action or causes the network device to perform an action. Most NDIs will be connected to at least one or more data channels. A data channel is a sensor, an actuator, a sensor and signal conditioning, an actuator and signal conditioning, or other analog or digital system. A data channel is a component of or is connected to the network device.

As described in greater detail below, the present invention remedies these and other problems by providing a network device interface (NDI) for connecting various data channels, such as sensors, actuators, and subsystems, to a common controller for transmission of commands and data to and from the data channels and the controller. Importantly, the NDI device of the present invention connects various data channels to the controller via a common network, thereby permitting the various data channels to share the same wiring for communicating with the controller. Further, the NDI of the present invention can interface to different types of data channels, which can be analog-to-digital or digital-to-analog or other. Sensors are connected to the NDI as analog-to-digital data channels and actuators are connected to the NDI as digital-to-analog data channels. The NDI of the present invention is capable of taking the digital data from an analog-to-digital channel, formatting it according to the proper protocol, and transmitting it onto the network according to the protocol. The NDI of the present invention is also capable of taking digital data from the network, providing it as digital data to a Digital-to-Analog converter (D/A), and causing the D/A to convert the data to an analog signal. It is possible for other embodiments of the NDI to accept or produce analog signals directly to and from its data channels. By transmitting the data across the network in a digital format, the commands and data are less susceptible to noise and degradation.

Further, the NDI device of the present invention operates in conjunction with a data protocol that allows the controller to communicate with either one or several network devices at a time across the network. Importantly, the data protocol used by the NDI device of the present invention has a fixed, low-level instruction set. Due to the simplicity of the protocol, the NDI device of the present invention is not required to be a high-level processor. Instead, in one preferred embodiment, the NDI device of the present invention is a state machine implemented as an Application Specific Integrated Circuit (ASIC). An advantage of using a state machine to implement the NDI device instead of a microcontroller or processor is that many processes can occur simultaneously, which aids the NDI device to be time deterministic and fast.

Advantageously, in one embodiment, the present invention provides a network device interface capable of communicating commands and data between a controller and a data channel using either synchronous or asynchronous communication. In this embodiment, the NDI device includes a receiver for receiving messages from the controller via the common digital bus. The NDI device of this embodiment further includes an interface for providing commands to the associated data channel in response to messages received by the receiver and for receiving data from the associated data channel. Additionally, the NDI device includes a transmitter for transmitting messages to the controller via the common digital bus. Importantly, the NDI device further includes a synchronous network bus clock detector.

In operation, when data is received from the controller, the clock detector of the NDI device of the present invention determines whether a clock signal accompanies the data from the controller. If a clock signal is present, then the controller is communicating in synchronous mode. In this instance, the NDI device uses the clock signal to provide commands and data to and receive data from the data channel. Further, the transmitter of the NDI device of the present invention uses the bus clock signal to transmit data to the controller.

However, if the clock detector of the NDI device does not detect a clock signal associated with the data sent from the controller, the NDI device determines that the bus controller is operating in the asynchronous mode. In this instance, the NDI device provides commands and data to and receives data from the data channel in an asynchronous mode independent of a bus clock. Further, the transmitter of the NDI device of the present invention transmits data to the controller asynchronously independent of a bus clock in the synchronous mode.

In one embodiment, the controller provides synchronous clock signals via a common clock bus. In this instance, the clock detector of the present invention receives the synchronous clock signals and analyses the signals to determine whether it is being sent at the same rate as the data bits. If so, the clock detector of the network device interface determines that the controller is operating in the synchronous mode.

Additionally, in some embodiments, the network device interface of the present invention may further include a bit rate detector connected to the common digital bus. In this embodiment, if the controller is operating in an asynchronous mode, the controller is transmitting commands and data at a certain bit rate. The bit rate detector of the present invention detects the bit rate, and the NDI device uses this bit rate to send commands and data to the data channel and receive data from the data channel. Further, the transmitter of the present invention uses the detected bit rate to transmit data back to the controller.

In addition to transmitting data in an asynchronous mode at a defined bit rate, the controller may also alter the bit rate during communication. In this embodiment, the controller may initially transmit a first message to a data channel at a predetermined bit rate. In this embodiment, the clock detector will not detect a synchronous clock signal, but the bit rate detector will detect the first bit rate at which the message is transmitted by the controller. Based on this first bit rate, the network device interface of the present invention uses this bit rate to send commands and data to the data channel and receive data from the data channel. Further, the transmitter of the present invention uses the detected first bit rate to transmit data back to the controller.

After the first or several messages are sent at the first bit rate, the controller may alter the bit rate and send a second message at a second bit rate. In this embodiment, the bit rate detector of the NDI device will detect the second bit rate at which the message is transmitted by the controller. Based on this second bit rate, the NDI device of the present invention uses this bit rate to receive commands and arguments from the bus controller and send data back to the bus controller.

In one embodiment, the controller may send an example message at an altered bit rate from the bit rate previously used for sending commands and data. In this embodiment, the bit rate detector of the NDI device detects the change in bit rate and the transmitter of the NDI device transmits data back to the controller at the new bit rate thereby, signifying that the bit rate has been altered. Further, in another embodiment, the controller may send a baud select command that defines the bit rate at which messages are to be transmitted.

As mentioned, the NDI device of the present invention operates in conjunction with a protocol. In one embodiment, the protocol uses a plurality of different addresses to address either one or several data channels at the same time. For example, in one embodiment of the present invention, the protocol uses a logical address to address an individual data channel, a group address to address a number of data channels, and a global address to address all data channels at the same time. In this embodiment, the logical and group masks are stored in a memory device associated with the NDI device of the present invention. The group masks are an efficient way for the NDI device to store a list of group addresses for each channel. A group mask is constructed that comprises a plurality of bits for each data channel. Each bit of the mask is associated with a respective group and has a first state indicating that the respective data channel is a member of the group and a second state indicating that the respective data channel is a nonmember of the group. The mask is also stored in the memory associated with the network device interface.

In this embodiment, whenever a command or data is sent it will include either a logical, group, or global address. For each command or data message that is sent, the address associated with the message is analyzed by the NDI device. If the address is global, the NDI device will implement the command. Likewise, if the address is logical and corresponds to the logical address of a data channel associated with the NDI device, the NDI device will implement the command. If the address is a group address, the NDI device of the present invention will determine if a data channel associated with NDI device is a member of the group defined by the group address by analyzing the mask associated with the respective data channel. The network device interface will only implement the command if the data channel is a member of the group having the group address.

As discussed above, the NDI device of the present invention is capable of operating in either a synchronous or asynchronous mode. Further, the controller is capable of providing a group address to send a command to a plurality of data channels at the same time. A problem arises, however, when the NDI devices connected to each data channel are operating in asynchronous mode, in that it is difficult to synchronize them such that they apply the command associated with the group address at the same time to the respective data channels connected to them. In light of this, in one embodiment, the NDI devices can be synchronized, even though they are operating in asynchronous mode.

Specifically, in one embodiment of the present invention, the controller transmits a command to a plurality of data channels, wherein the command comprises a plurality of bits having a value defined by a transition between first and second states. In this embodiment, each of the NDI devices of the present invention commences implementation of the command at the same predetermined time relative to the transition that defines the value of a respective bit of the command such that the plurality of network device interfaces perform the command simultaneously in a time-deterministic manner. In one further embodiment, the controller transmits a command comprising a sync portion, a message body and a parity bit. In this embodiment, the NDI devices of the present invention commence performance of the command coincident with the transition that defines the value of the parity bit. Further, in another embodiment, the controller transmits a command comprising a start bit, a command field, an address filed having an unused last bit set to 0, and a stop bit set 1. In this embodiment, the NDI devices of the present invention commence performance of the function at each data channel coincident with the transition from the unused bit of the address field to the stop bit.

In addition, as described above, in the synchronous mode, the controller transmits a synchronous clock signal on the common digital bus. In this embodiment, the NDI device of the present invention may also provide for synchronous implementation of commands between several network device interfaces by using the synchronous clock signal. Specifically, in this embodiment, the controller transmits a command to a plurality of data channels, where the message comprises a plurality of bits having a value defined by a transition between first and second states. Further, the controller transmits a synchronous clock signal comprised of a plurality of clock pulses from the controller to the plurality of data channels simultaneous with the message. In this embodiment, the plurality of the network device interfaces will commence performance of the command at the same predetermined time as defined by a respective clock pulse which, in turn, is defined based upon a predetermined relationship to a respective bit of the message.

For example, in one embodiment, the network device interfaces commence performance in synchronization with the first clock pulse following the respective bit of the message. Specifically, in one embodiment, the message transmitted has a plurality of bits having a value defined by a transition between a first state and a second state and the message defines a sync portion, a message body and a parity bit. In this embodiment, the network device interfaces commence performance of the command at the same predetermined time as defined by a respective clock pulse which is, in turn, defined based upon a predetermined relationship to the transition that defines the value of the parity bit of the message.

As discussed, the NDI device of the present invention operates in conjunction with a protocol that has a fixed, low-level instruction set that, in turn, allows in some case for use of simplified controllers and network device interfaces on network devices. Specifically, in one embodiment, the present invention provides a protocol stored on a computer-readable medium. The protocol is used for transmitting commands and data between a controller and a network device interface across a common digital network. Importantly, the protocol includes at least one of a command and a data structure for sending respective commands and arguments to data channels. The data structure is also used to send data from data channels to the bus controller.

In light of this, the present invention also provides a serial, multiplexed communication system that uses state machines. Specifically, the communication system of the present invention includes a controller for issuing a plurality of commands and a plurality of data channels for performing predefined functions in response to the commands. Connecting the controller and network device interface is a common digital bus for supporting communication therebetween. Further, the communication system includes a plurality of network device interfaces, one of which is associated with each data channel for interconnecting the respective data channels with the common digital bus. In this embodiment, each network device interface comprises a state machine and is independent of a processor.

As mentioned previously, in the synchronous mode, the controller provides a synchronous clock signal across the network bus to the network device interfaces. In the synchronous mode, the synchronous clock is used as the clock signal for transmitting data. However, some A/D and D/A converters, as well as some signal conditioning devices, cannot operate at the clock speed set by the synchronous clock. In light of this, in one embodiment of the present invention, the network device interface of the present invention may include a clock divider. The clock divider may either be connected to the synchronous clock signal output by the controller or it may be connected to a local oscillator.

Specifically, in this embodiment, there is a bus controller, sending a synchronous clock signal and commands to the network devices at one frequency, and NDI devices listening to the synchronous clock and data from the bus controller. The NDI devices are converting the data and commands from the bus controller into the proper format expected by the data channels connected to the NDI devices, and the NDI devices are simultaneously providing the divided second clock signal to data channels, such that the data channels operate in accordance with the second clock signal frequency to convert data while the controller and NDI devices operates in accordance with a first clock frequency to send commands and data over the network bus.

In one further embodiment, the NDI device of the present invention further includes a method for synchronizing the dividers associated with each NDI device with those of all other NDI devices connected to the common digital bus. Specifically, as stated previously, in some embodiments, the controller will send a group address so that a command is performed on a plurality of data channels at the same time. In order for this to occur, however, all of the clock dividers provided to data channels that use the divided clock located at each NDI device must be synchronized. In light of this, in one embodiment, the controller sends a first clock signal across the common digital bus. Further, the controller commands each of the dividers to synchronize the transmission of their respective second clock signals with an edge of the first clock signal such that individual second clock signals provided by each of the dividers is synchronized with respect to the first clock signal to thereby synchronize each of the converters.

In addition to operating in accordance with different clock signals, some A/D and D/A converters also operate in accordance with specialized commands that are different from the commands used by the controller. In light of this, the network device interface of the present invention may include a special feature used to provide the specialized commands for the converter. This feature is called command translation. As such, during operation, the NDI device of the present invention receives commands and data from the controller in accordance with a first set of commands and converts the command in accordance with a second set of commands for application to the converter. Further, the NDI device of the present invention may send data received from the converter across the common digital bus in accordance with the first set of commands.

The preferred protocol for the NDI devices uses Manchester encoding of network data bits to help allow miniaturization of the NDI devices. It must be understood that for any device to receive asynchronous serial data, it must be able to acquire the timing of the data sequence from the serial data stream. Normally, the receiver of the serial asynchronous data must have a local oscillator to cause its receiver to operate, and recover the timing information from the serial data. Once the timing information has been extracted, the asynchronous receiver is able to receive serial data at certain rates, plus or minus a certain deviation from these rates, given this local oscillator frequency. Manchester encoding of serial data causes a transition from high to low or low to high in the center of every bit. This makes it easy to extract the necessary timing information from the serial data stream. Because it is so easy to extract the timing information from the Manchester encoded serial data stream, a relatively large deviation from the expected data rate, based on the local oscillator can be tolerated. This tolerance to relatively large deviations from the expected data rates allows each NDI receiver to use a low accuracy local oscillator to receive the Manchester encoded data. Low accuracy local oscillators can be made extremely small. Current embodiments of adequate local oscillators are only about 1×1.5 millimeters. This aids in making miniature NDI devises.

DETAILED DESCRIPTION OF THE INVENTION

Figure 1:
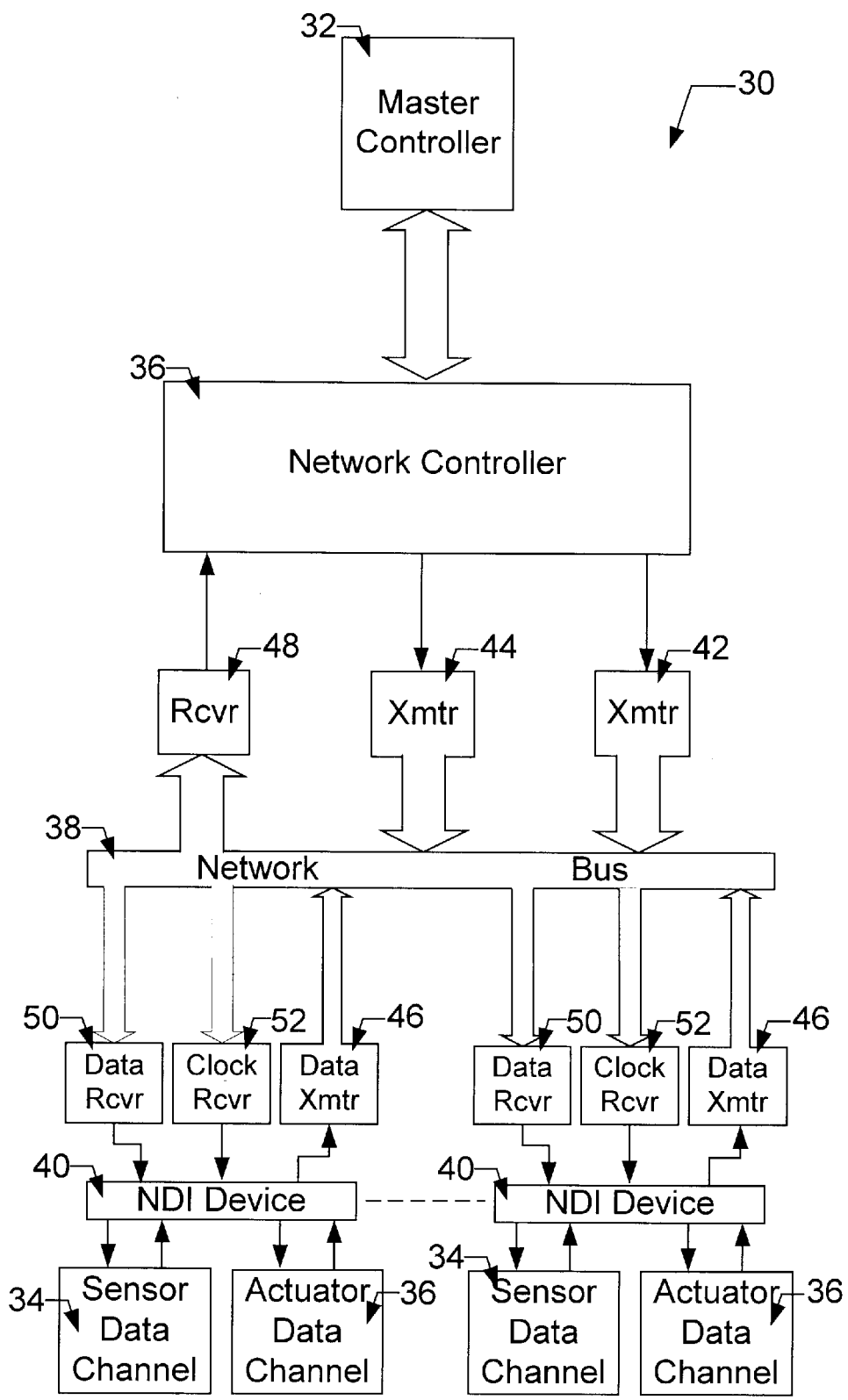
FIG. 1 is a block diagram of a networked system for transmitting commands and data digitally between a controller and a plurality of data channels via a network bus according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As described above, many conventional data acquisition and control systems use individual wiring to connect remote devices, such as sensors, actuators, and subsystems, to a central controller for data acquisition and control. Due to the large number of remote devices, the total of the individual wiring for each of these devices can be expensive, bulky, heavy, and difficult to install and maintain. Further, since many of these remote devices are analog, signals to and from the remote devices are susceptible to noise and signal degradation.

As described in greater detail below, the present invention remedies these and other problems by providing a network device interface (NDI) for connecting various data channels, that can be sensors, actuators, and subsystems, to a common controller for transmission of commands and data to and from the data channels and the controller. Importantly, the NDI device of the present invention connects various remote devices to the controller via a common network, thereby permitting the various remote devices to share the same wiring for communicating with the controller. Further, the NDI of the present invention can interface to different types of data channels, which can be analog-to-digital or digital-to-analog or other. Sensors are connected to the NDI as analog-to-digital data channels and actuators are connected to the NDI as digital-to-analog data channels. The NDI of the present invention is capable of taking the digital data from an analog-to-digital channel, formatting it according to the proper protocol, and transmitting it onto the network according to the protocol. The NDI of the present invention is also capable of taking digital data from the network, providing it as digital data to a Digital-to-Analog converter (D/A), and causing the D/A to convert the data to an analog signal. It is possible for other embodiments of the NDI to accept or produce analog signals directly to and from its data channels. By transmitting the data across the network in a digital format, the commands and data are less susceptible to noise and degradation.

Further, the NDI of the present invention operates in conjunction with a data protocol that allows the controller to communicate with either one or several network devices at a time across the network. Importantly, the data protocol used by the NDI device of the present invention has a fixed, low-level instruction set. Due to the simplicity of the protocol, the NDI device of the present invention is not required to be a high-level processor. Instead, in one preferred embodiment, the NDI device of the present invention is a state machine implemented as an Application Specific Integrated Circuit (ASIC). An advantage of using a state machine to implement the NDI instead of a micro-controller or processor is that many processes can occur simultaneously, which aids the NDI to be time deterministic and fast.

As mentioned above, the NDI of the present invention is used as an interface between a common controller and various network devices that are connected to the controller by a common network. FIG. 1 is an illustration of one embodiment of the implementation of the interface of the present invention. This illustration is provided so that a more complete understanding of the present invention may be appreciated. It must be understood that the present invention is not limited to this configuration and may be embodied in many different network systems. The current embodiment of the NDI uses the RHAMIS-HS protocol, however, other embodiments contemplated by this disclosure may use other protocols.

With regard to FIG. 1, a general embodiment of a networked system 30 in which the present invention is used is shown. Specifically, the networked system includes a master controller 32 such as high-level processor or personal computer that processes data from and sends commands and data to data channels 34, such as sensors, actuators, and subsystems, located at desired points in the network. Importantly, the networked system further includes a network controller 36 connected between the master controller 32 and a network bus 38, and either one or several NDI devices 40 connected between the network bus and the data channels . Connecting the network controller and NDI devices to the network bus are respective transmitters, 42–46, and receivers 48–52. A first transmitter 42 connected between the network controller and the network bus transmits commands and data on the network, while a second transmitter 44 also connected between the network controller and network bus may be used in some embodiments to transmit a synchronous clock signal.

In normal operation, the remote devices that are sensors are connected to a specific object under study and sense characteristics of the object such as temperature, strain, flex, speed, air flow, etc. Further, the remote devices that are actuators are connected to mechanical members and other structures to operate on the object under test. One or several of the remote devices are connected to a single NDI device of the present invention via individual data channels containing converters and signal conditioning devices. Further, either the master controller or the network controller may be configured to send data and commands across the network to the various network devices. Given that both of these controllers are capable of such action, the generic term bus controller is used in the discussion below to describe operations that may be performed by either the master or network controller.

Figure 2:
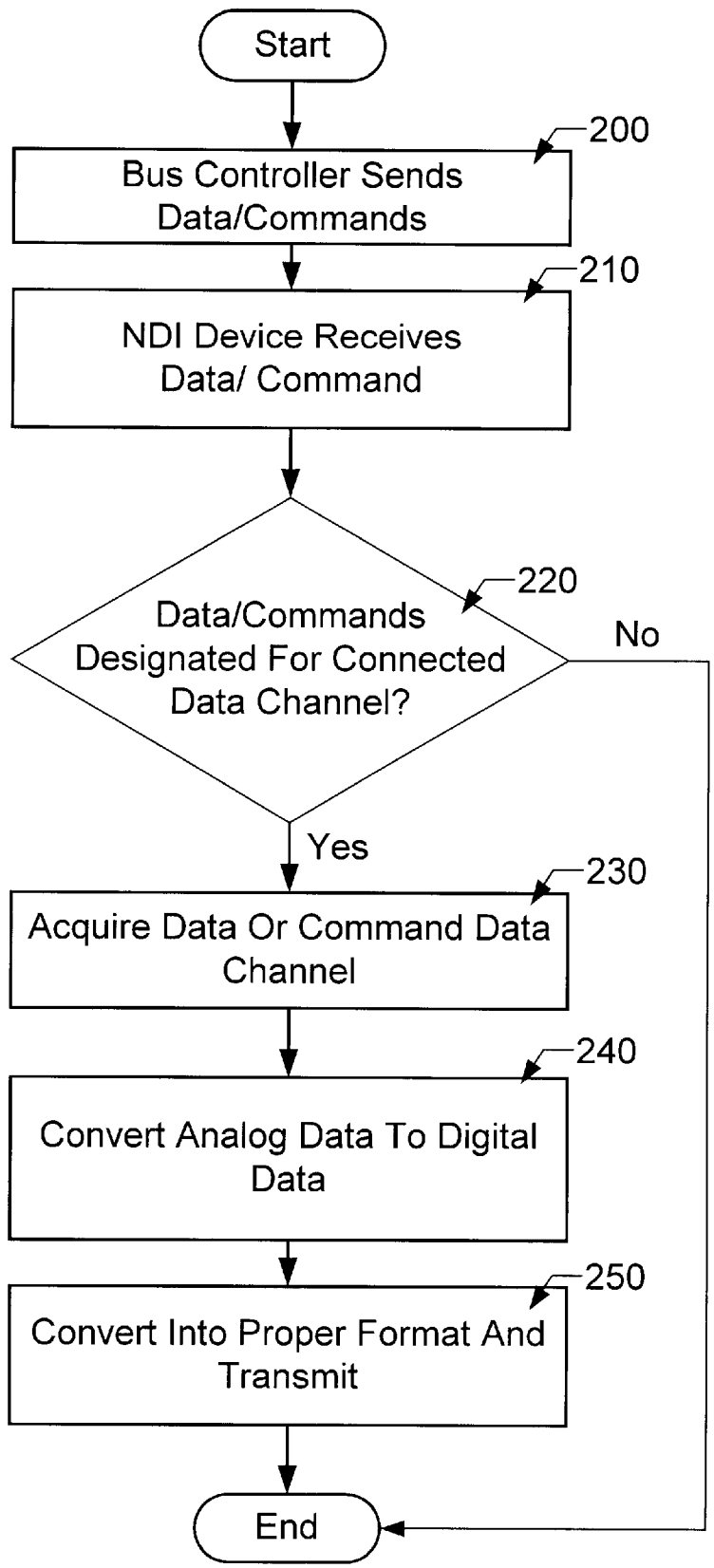
FIG. 2 is a block diagram of the operations preformed to transmit commands and data digitally between a controller and a plurality of data channels via a network bus according to one embodiment of the present invention.

With reference to FIG. 2, to acquire data from a sensor or activate and actuator, the controller sends commands and data digitally across the network to the remote devices, where the command and data is designated for either one or a group of the data channels on the remote devices. (See step 200). The commands and data are transmitted across the network using a data protocol. The NDI devices of the present invention receive and interpret the data and commands using the structure of the data protocol. (See step 210). Further, the NDI devices of the present invention determine whether the commands and data are designated for the data channels connected thereto. (See step 220). If so, the NDI either acquires data from the designated data channel if it is a sensor or commands the data channel to perform a conversion if it is an actuator. (See step 230). Analog data retrieved from the sensor channels is first converted into digital data, (see step 240), and then converted into the proper format according to the data protocol. Further, the digital data is transmitted to the controller. (See step 250).

As illustrated in FIGS. 1 and 2, the NDI device of the present invention operates as an interface between the bus controller and the data channels. Importantly, the NDI device of the present invention is capable of accepting digitized, analog data signals from data channels for transmission across the network bus. The NDI can also accept digital data from the bus controller and present it to a data channel. Then a D/A converter can change the data to an analog signal. It is possible that some data channels would accept and use the digital data directly without converting it to analog. Some embodiments of an NDI may have an analog-to-digital (A/D) converter and a D/A converter integrated into the NDI, thereby being configured to accept or present analog signals from or to data channels. The NDI device of the present invention also operates in conjunction with a selected data protocol to properly receive and decode or format and send data efficiently via a network bus.

Further, the NDI device of the present invention provides additional operations and features, such as programmable trigger command conversion, and clock signals, that allow the controller to communicate with different types of devices that compose data channels. Additionally, the NDI device of the present invention includes stored information and procedures for configuring the data channels connected thereto. A/D and D/A converters are examples of components of data channels that may need to be programmed or configured. The NDI device of the present invention may also provide a local clock signal to data channels that is some fraction or multiple of the local oscillator or synchronous bus clock. The local clock signals of many or all NDI devices on a network can be synchronized by the bus controller. Further, the NDI device of the present invention operates in conjunction with the data protocol to provide a unique logical address and group addresses for each of the data channels, such that the data channels may be either addressed individually, in a synchronized group, or all together.

In addition to allowing for data communication between the controller and remote devices and data channels having different configurations, the NDI device of the present invention also allows for data communication across the bus network using different data transmission modes. Specifically, in one mode of the present invention, the NDI device of the present invention operates in conjunction with the controller in a synchronous mode, in which a synchronous clock signal provided by the controller is used by the NDI device to receive commands and data from the bus controller. This same synchronous clock signal is used by the NDI to send data to the bus controller or other network devices.

As a note, the NDI devices typically do not transmit the synchronous bus clock signal back to the bus controller. Instead, the NDI devices typically only clock data out on received edges of the synchronous bus clock signal in the synchronous mode. Generally, only the bus controller transmits the synchronous bus clock signal. Further, the bus controller will typically include an asynchronous receiver for receiving data from the NDI devices.

In another mode, which can be the same or different embodiment, the NDI device operates in conjunction with the controller in an asynchronous mode. In this embodiment, the NDI device of the present invention analyzes and determines the bit rate at which the controller is transmitting data on the network bus and then uses this bit rate to retrieve commands and data from the bus controller and send data to the bus controller or other network devices. Also in the asynchronous mode, the NDI device may still synchronize data conversion on data channels located on different NDI devices. Data conversion is synchronized on the separate data channels by having it occur on or very shortly after the changing edge of a special bit in a command from the bus controller.

Figure 3A:
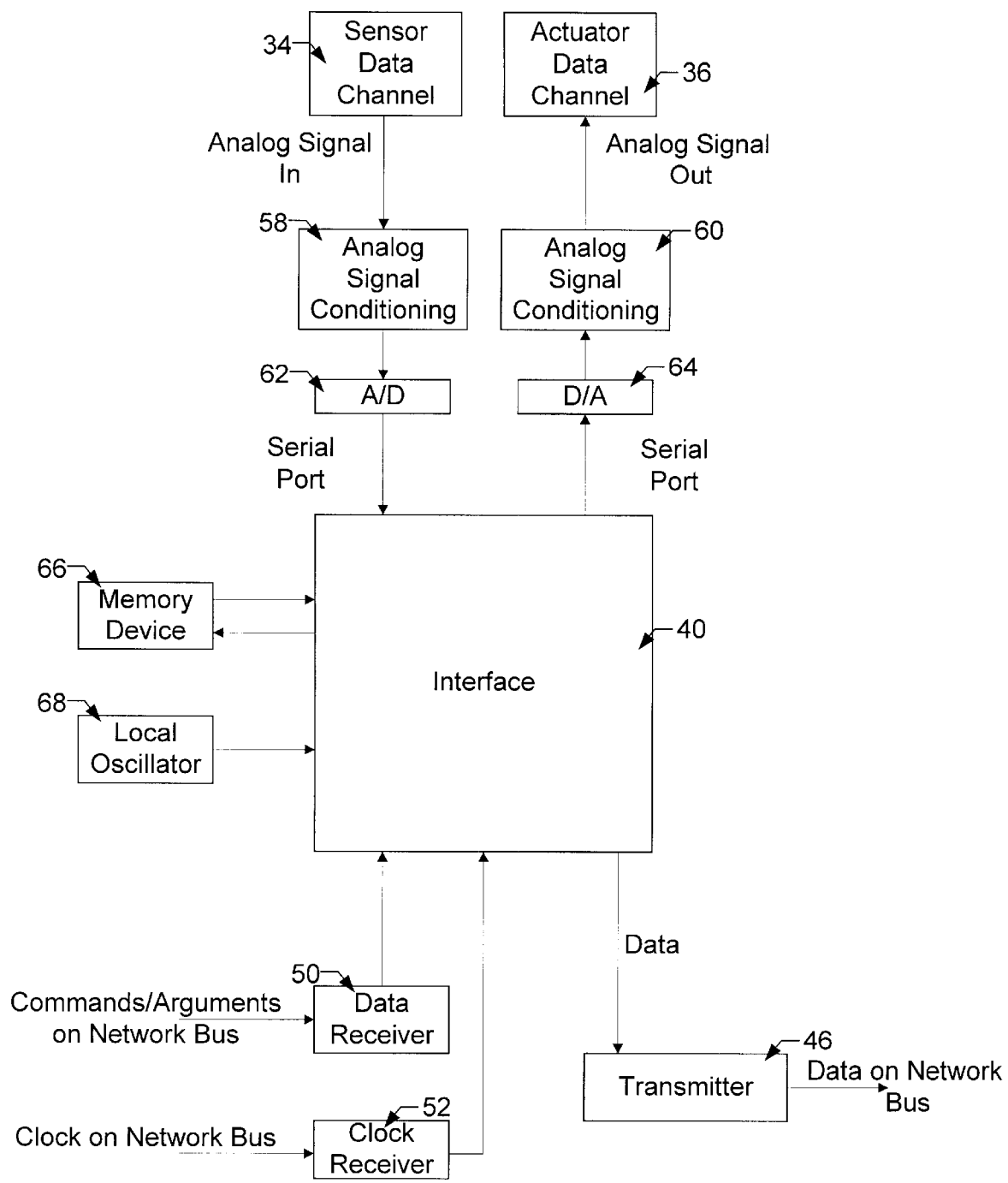
FIGS. 3A and 3B are generalized block diagrams of a NDI device for digitally communicating commands and data between data channels and a controller across a network bus according to one embodiment of the present invention.
Figure 3B:
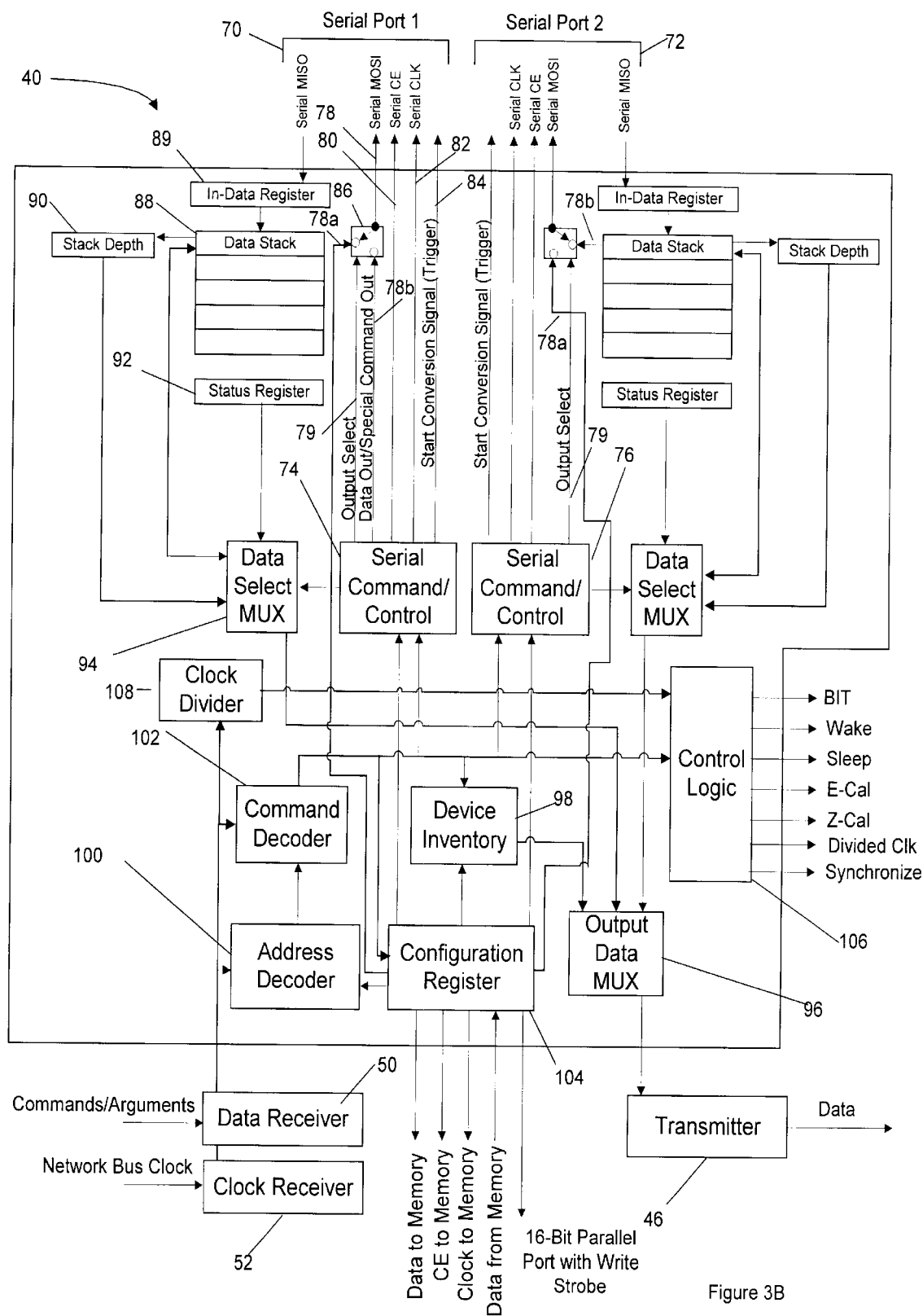

These and other advantages are realized by the NDI device of the present invention; one embodiment of which is illustrated in FIGS. 3A and 3B. Specifically, FIG. 3A illustrates a generalized block diagram of a NDI device 40 according to one embodiment of the present invention. As illustrated, the NDI device of the present invention is connected between the network bus 38 and remote devices 34 and 36, such as illustrated previously in FIG. 1. In this embodiment, one of the remote devices 34 is a sensor and the other remote device 36 is an actuator or similar device. Both remote devices contain signal conditioning devices, 58 and 60, for conditioning analog signals. With regard to remote device 34 the signal conditioning 58 is for a sensor signal. The signal conditioning for an actuator is shown in 60. Signal conditioning can include but is not limited to amplifiers, filters, attenuators, etc.

Importantly, connected between the remote devices and the NDI device of the present invention are A/D and D/A converters, 62 and 64, respectively. The A/D converter 62 is connected between the NDI device and the sensor 34. The A/D converter converts analog signals from the sensor channel into digital data for input into the NDI device. Similarly, the D/A converter 64 is connected between the NDI device and the actuator device 36 and converts digital signals from the NDI device into analog signals for input into the actuator channel. It is possible that some sensors and some actuators could produce or accept digital signals directly so that the A/D 62 or D/A 64 is not necessary.

As illustrated previously in FIG. 1, the NDI device of the present invention is connected to the network bus via a first receiver 50 that receives commands and data from the controller. A second receiver 52 is also provided for receiving the optional synchronous clock signal from the controller if the network is operated in synchronous mode. A transmitter 46 is also connected between the NDI device of the present invention and the network bus for transmitting data to the controller. Further, a memory device 66 and a local oscillator 68 are connected to the NDI device of the present invention. Different embodiments of the NDI device could integrate some or all of the following: the receivers, transmitters, local oscillator, and memory.

FIG. 3B provides an illustration of the various control logic components of the NDI device 40 according to one embodiment of the present invention. Specifically, the NDI device of this embodiment of the present invention includes ports, 70 and 72, for connecting to the data channels, 34 and 36. These ports are typically serial ports, but may be parallel ports in some embodiments. The ports of the NDI device are controlled by individual port controllers, 74 and 76. Data lines incorporated in each port include a data output line 78 referred to as Serial MOSI (master out slave in), a chip enable or chip select line 80 referred to as CE, a clock signal line 82 referred to as Serial CLK, and a trigger 84. As illustrated, the data output line 78 consists of a configuration data output line 78a and a data out/special command out line

78b. The configuration data output line 78a is used as described later for configuring the data channel at power up. Further, the data out/special command out line supplies data from the bus controller to the data channel. The output select line 79 toggles a select switch 86 between the configuration data output line and Serial out data line depending on whether the NDI device is in power up mode or in normal operation.

As mentioned, the NDI device of the present invention further includes a data stack 88 defined as a plurality of data registers creating a memory. The data stack is used for storing digital data acquired from a data channel. A data stack can also be used for storing data from the bus controller to send to a data channel. The data stack is typically operated as a last-in-first-out (LIFO) device, where the last value placed in the data stack is the first value retrieved from the stack. This way, no matter what the stack size, data will be returned to the bus controller by different NDI devices in the same order. There is minimum delay between putting a new data value on the top of the stack to when the bus controller can read it. However, there would be a large delay if the bus controller had to read data from the bottom of a stack.

As illustrated, associated with the data stack is a stack depth register 90. The stack depth register indicates the number of valid data words in the stack at that time.

Further, internal to the current embodiment of the NDI device of the present invention are a status register 92 and a data select multiplexer 94 for each data channel. Importantly, the status register includes information relating to the status of the data channel, such as whether the data channel is in a ready mode, whether the data channel supports a command, or whether there is a message transmission error, etc. The data select multiplexer, depending on the data requested, connects either the status register, data stack, or stack depth register, to an output data multiplexer 96. The data select multiplexer 94 for each channel is controlled by the respective port controller, 74 and 76. The output data multiplexer 96, in turn, selects between the output of the two remote devices or a device inventory register 98. Different embodiments of the NDI device may have different multiplexer arrangements in the NDI device, but the effect will always be to allow the bus controller to access any register for any data channel in an NDI device that it needs.

Figure 8:
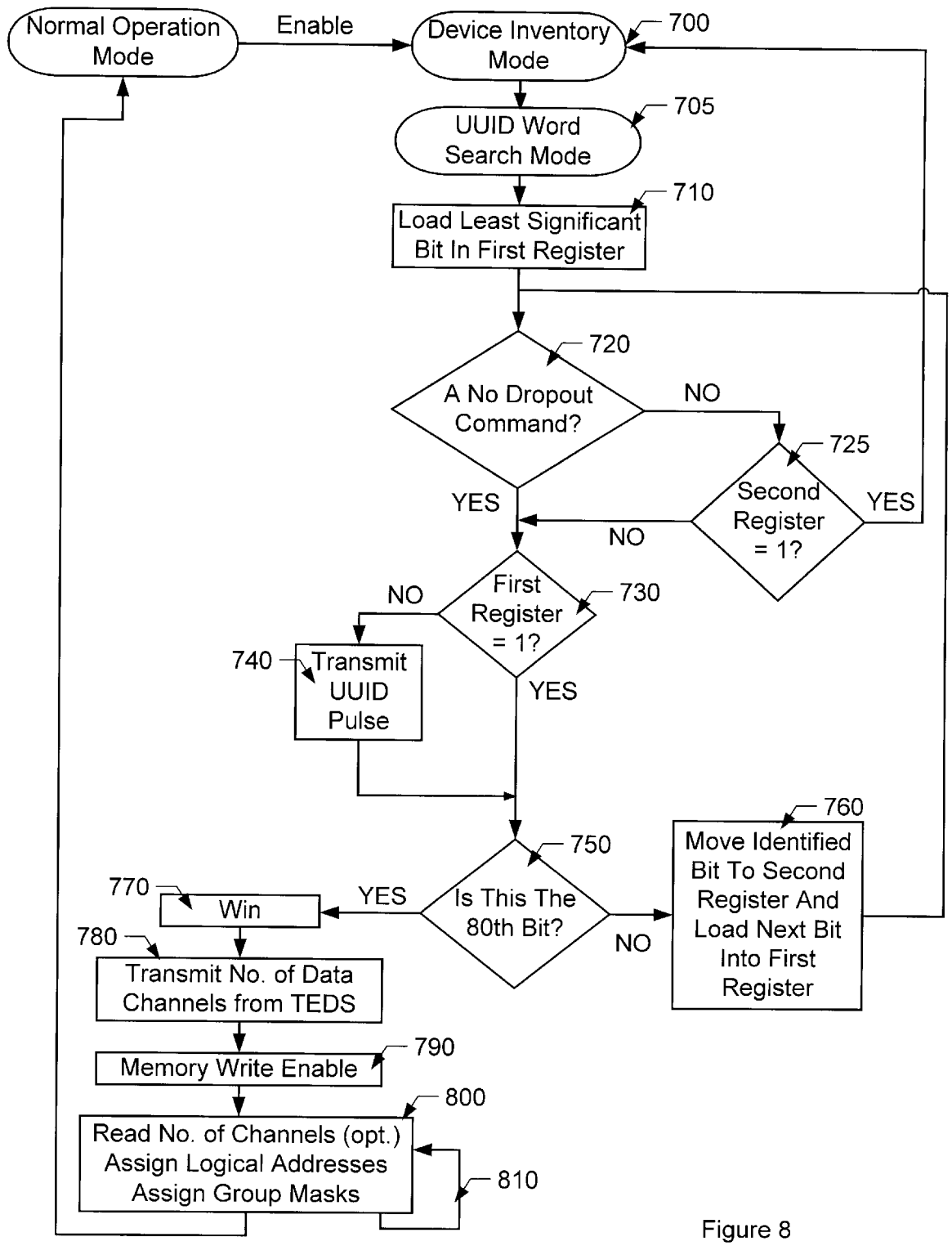
FIG. 8 is a block diagram of the operations performed by an NDI while the bus controller is assigning logical addresses and group addresses to the network device according to one embodiment of the present invention.

The Device Inventory block 98 is used by the NDI device to execute the Device Inventory operations that are shown in the flow chart in FIG. 8.

Further, the NDI device of the present invention also includes an address decoder 100 and a command decoder 102. As described later below, these decoders receive the command and data transmitted by the controller, decode the commands and data, and determine whether the commands and data are addressed to one or more of the data channels connected to the NDI device. If the commands and data are addressed for one of the data channels, the NDI device of the present invention will operate on the data channel in accordance with the command. The above components are sometimes referred to herein as a device interface.

An NDI device will include a non-volatile memory indicated in FIG. 3A as memory device 66 that will be used by the NDI to store the UUID, protocol version, number of data channels, logical addresses, group masks, configuration data, and other data that the manufacturer or user may define. The communication with this memory device is illustrated in FIG. 3B by the input and output lines from the configuration register 104 to the memory device. The bus controller will be able to read the memory and write to various memory locations according to the protocol. The logical address and group mask fields in memory are special. They can only be written to by the bus controller immediately after the NDI device has won a Device Inventory Competition according to the flow diagram in FIG. 8. This allows every NDI device to be uniquely identified by the bus controller and then the logical addresses and group masks to be assigned. By mandating that a Device Inventory Competition must be won prior to writing to these fields, it becomes virtually impossible to accidentally change these values. This same sort of memory protection can be applied by the NDI device manufacturer to other memory fields.

At power up some of the contents of the non-volatile memory 66 are loaded into the logical and group address decoder registers 100, configuration registers 104 for the Serial ports, 70 and 72, command translation registers in port controllers, 74 and 76, and some contents are sent out the Serial ports or other parallel ports for configuring data channels. There may be other uses for this memory data at power up. This memory can also be used by the bus controller to store user-defined information such as network device installation location, calibration data, etc. The contents of this memory are commonly called TEDs which stands for Transducer Electronic Data Sheet.

Further, the NDI device of the present invention may include control logic 106 for receiving commands and performing built in testing, calibration, and transitioning the NDI device between a sleep and wake mode.

As illustrated in FIG. 1, the NDI device of the present invention communicates with a controller across a network bus. The discussion of the various operations of the present invention described below are with regard to the NDI device. Detailed operation of the master and network controllers is not described herein. However, a complete detailed disclosure of the operation of the master controller and network controller is provided in U.S. Provisional Patent Application Ser. No. 60/254,137 entitled: NETWORK CONTROLLER FOR DIGITALLY CONTROLLING REMOTE DEVICES VIA A COMMON BUS and filed on Dec. 8, 2000. The contents of this patent application are incorporated in its entirety herein by reference.

As mentioned, the NDI device of the present invention provides several advantages. One important aspect of the NDI device of the present invention is self-configuration at power up of the A/D and D/A converters and the remote devices connected to the NDI device. As illustrated in FIG. 1, the remote devices connected to the network bus may be numerous and spread far apart making it difficult to configure the devices from a central location. In light of this, in one embodiment of the present invention, the NDI device includes data related to the gain, offset, filters, etc. of the signal conditioning devices, 58 and 60, and data related to the A/D and D/A converters stored in the memory device 66, (illustrated in FIG. 3A). Specifically, in one embodiment, the NDI device of the present invention allows 16, 16-bit digital words from the memory device to be output each of the ports, 70 and 72, at power up. This aspect of the NDI device of the present invention allows for automatic configuration of off-the-shelf A/D and D/A converters.

The configuration data stored in the memory device is programmable by the controller. The 16, 16-bit words can be programmed to be split into 32, 8-bit bytes for output by the ports to the A/D and D/A converters and signal conditioning. Further, the NDI device of the present invention can be programmed by the controller to change the Serial clock 82 phase and Serial clock 82 polarity at which the configuration data is output at the ports, 70 and 72.

In addition to configuring the A/D and D/A converters and signal conditioning devices at power up, the NDI device of the present invention is also configurable to operate with different types of A/D and D/A converters and signal conditioning devices. Specifically, there are many types of converters, such as successive approximation A/D converters and sigma/delta oversampling converters. These converters may operate differently in terms of clocking and operational delay. Further, some signal conditioning devices, such as switched capacitor filters and digital anti-alias filters operate differently in terms of clocking.

For example, as illustrated in FIG. 1, in the synchronous mode, the controller provides a synchronous clock signal across the network bus to the network devices. In the synchronous mode, the synchronous clock signal is used as the clock signal for transmitting network data. Some A/D converters, such as Analog Devices' AD7714 converter need a continuous clock signal to operate correctly. This clock is usually lower frequency than the synchronous clock signal provided by the controller. In light of this, in one embodiment of the present invention, the NDI device of the present invention may include a clock divider 108. The clock divider may either be connected to the synchronous clock signal output by the controller as shown in FIG. 3B or it may be connected to a local oscillator 68, as illustrated in FIG. 3A.

Figure 9:
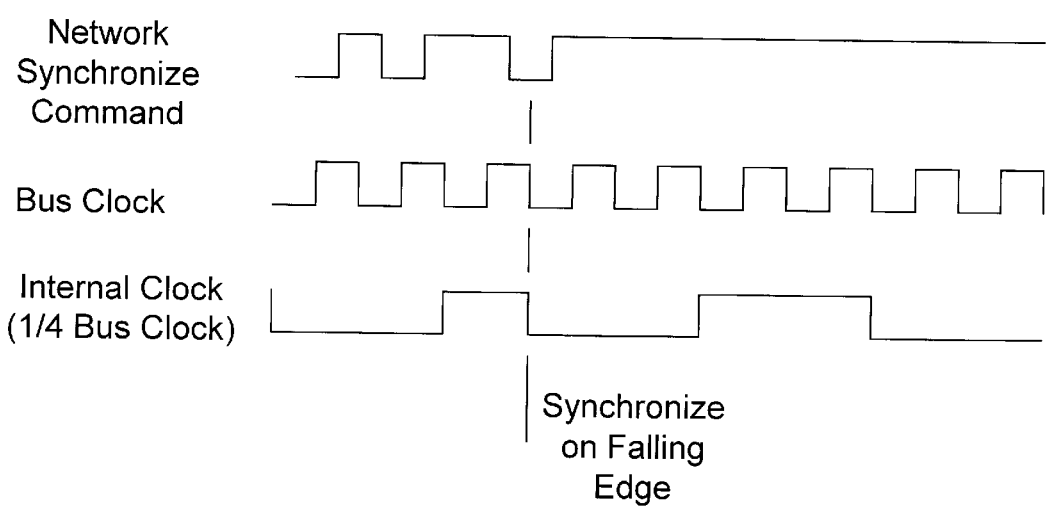
FIG. 9 is graphic diagram illustrating the synchronization of an internal free running clock provided by the NDI device to a data channel in order to synchronize the free running clocks of multiple data channels attached to the network through multiple NDI devices according to one embodiment of the present invention.

This clock signal provided by the NDI device can be synchronized by the bus controller as shown in FIG. 9. The clock signal can simultaneously be synchronized in one, several, or all NDI devices on the bus. In the example in FIG. 9 the internal clock frequency is shown as ¼ the synchronous bus clock frequency. It could actually be any other fraction of the synchronous bus clock frequency.

Figure 4:
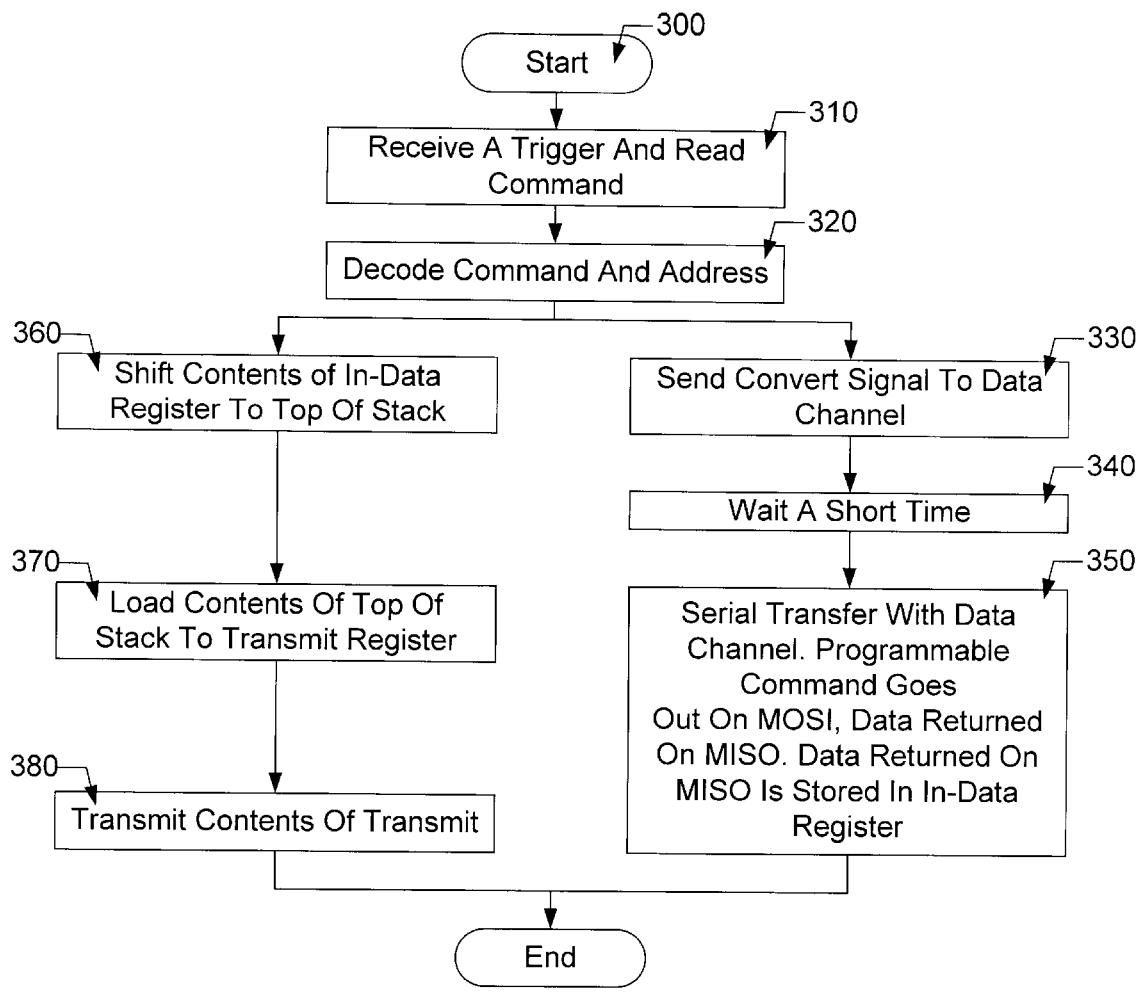
FIG. 4 is a block diagram of the operations performed by the NDI to retrieve data from a remote devices and illustrates the ability of the NDI device to perform multiple tasks at the same time while simultaneously communicating with the bus controller according to one embodiment of the present invention.

FIG. 4 is a block diagram of the operations performed by the NDI in response to one particular command from the bus controller. This diagram illustrates that the NDI device is capable of doing more than one task at a time. The ability of the NDI device to do multiple tasks at the same time allows the NDI device of the present invention to acquire or control 1 or more data channels at the same time while simultaneously communicating with the bus controller.

With reference to FIG. 4, in operation, the NDI device of the present invention initially receives a command, (see step 310), such as Trigger and Read command, from the controller and interprets the command. If the command and address are intended for a data channel on the NDI device the NDI device begins the operations shown in steps 330 and 360 in parallel. Specifically, the NDI device sends a convert signal to the data channel attached to the NDI. (See step 330). The rising edge of this data pulse occurs at the center edge of the parity bit at the end of the Trigger and Read command. The convert signal is provided to latch analog data into the sample and hold circuitry of an A/D converter, or can be used to cause a D/A to start a conversion process. The precise timing of the rising edge of this signal allows many data channels to know when to sample or convert analog data, even if the network devices are not operating in synchronous mode.

After the convert signal is created, a short pause occurs. (See step 340). This pause allows the data channel to have time to convert the analog signal latched in its sample and hold to be converted into a digital value. In the present embodiment of the NDI device, this pause is programmable. There are two choices. It can be only a few hundred nanoseconds long, or it can be programmed to be 6 microseconds long.

After the pause, a serial transfer occurs. (See step 350). During this Serial transfer a programmable word is clocked out on the MOSI line. This programmable word is used to cause special A/D converters to output data. An example is an AD7714. As this serial transfer continues, data is returned from the data channel to the NDI device. The digital data returned to the NDI device on the MISO line is stored in the in data register 89.

At the same time operational steps 330, 340, and 350 are occurring, operational steps 360, 370, and 380 are also occurring. In operation step 360, the contents of the in data register 89 are shifted into the top of the data stack. Next, the contents in the top of the data stack are loaded into the transmitter register. (See step 370). The last operation is for the contents of the transmitter register are transmitted back to the bus controller by the NDI device's transmitter 46. (See step 380).

During all of these operations, the NDI interface is providing a continuous clock signal to the data channel. Not all data channels will use this clock but it is available. The frequency of this clock is programmable. This clock signal is useful for running devices such as switched capacitor filters, digital filters, or sigma/delta converters, etc. This clock signal continues running even when operational steps 300–380 are not taking place.

In instances where the Universal Asynchronous Receiver Transmitter (UART) protocol is used, the controller transmits a command comprising a start bit, a command field, an address filed having an unused last bit set to 0, and a stop bit set 1. In this embodiment, the NDI device of the present invention commences performance of the function at each data channel coincident with the transition from the unused bit of the address field to the stop bit.

In addition to clock and delay issues, some A/D and D/A converters also require special commands. For example, some A/D and D/A converters are programmable to take different readings from a sensor. For instance, in one application, an A/D converter is connected to a strain gauge that senses strain in three dimensions. Each readable dimension is addressable with a separate 16-bit address. Either one or all of the measurements for each dimension may be accessed by applying the associated 16-bit command to the converter. It may become burdensome to store all of the bit commands in the controller and transmit them across the network bus. To simplify operation of the protocol, (as discussed below), the NDI of the present invention maintains these special commands so that they do not have to be kept up with by the controller or sent across the network. In light of this, in one embodiment, the NDI of the present invention includes the specialized bit commands associated with the A/D or D/A converters connected to the NDI. With reference to FIGS. 3A and 3B, these commands are originally stored in the memory device 66, where they are programmable. During power up, these specialized bit commands may be stored in the command decoder 102.

Figure 5:
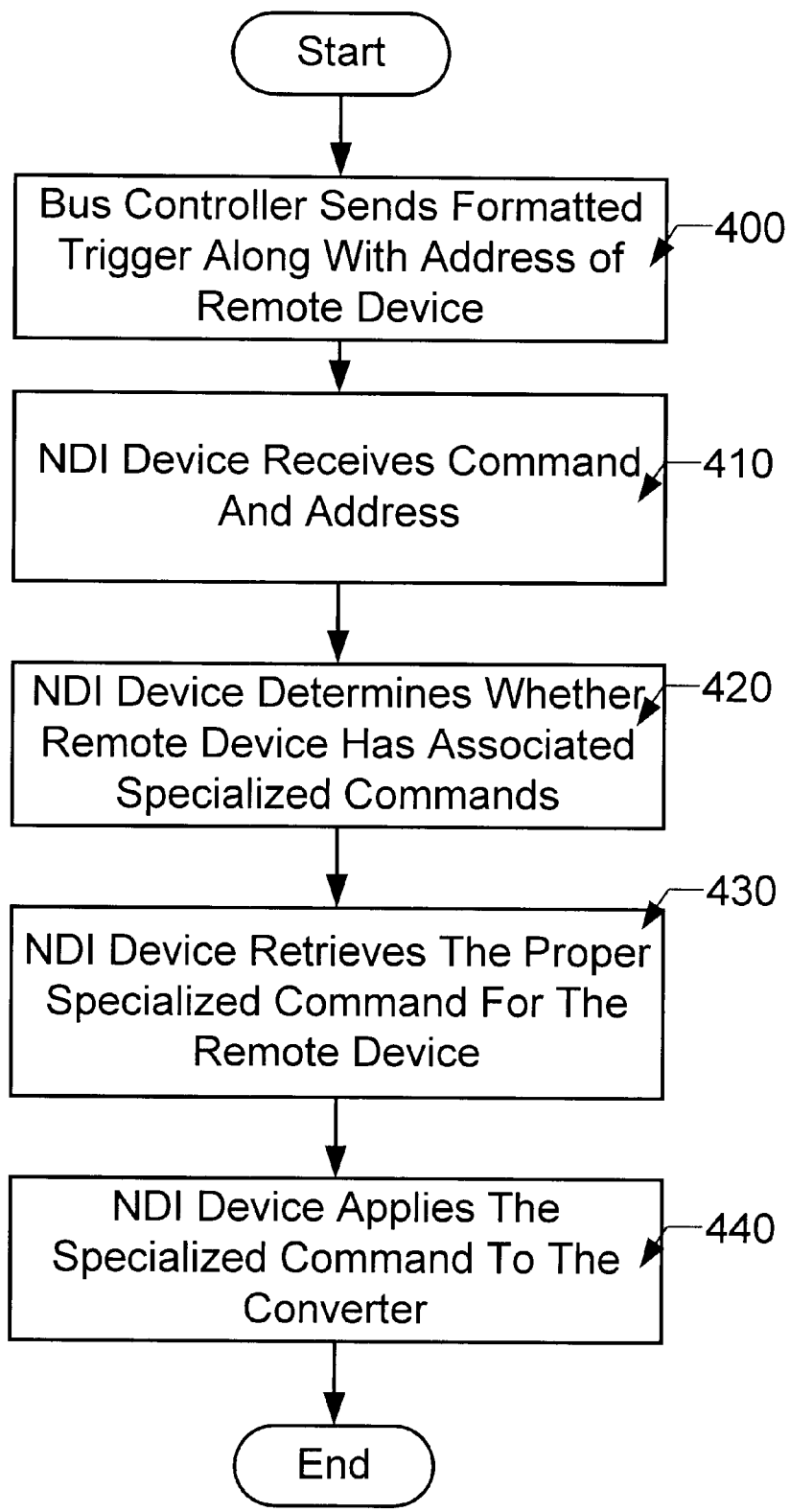
FIG. 5 is a block diagram of the operations performed to translate commands sent by a controller to a remote device into specialized commands used by a converter connected to the NDI, such that the controller may communicate with the remote device according to one embodiment of the present invention.

With reference to FIG. 5, in operation, when a remote device having a converter with specialized commands is to be addressed, (to either obtain data from a sensor or in the case of an actuator, activate the remote device), the controller will send a properly formatted trigger command along with the address of the data channel with the converter. (See step 400). (The format of commands is discussed below). When the NDI associated with the data channel receives the command and address, (see step 410) the NDI initially determines whether the remote device addressed needs specialized commands. This is done by comparing the address received to the address associated with the data stored in the command decoder. (See step 420). Based on the address, the NDI of the present invention retrieves the proper specialized command from the command translation register. (See step 430). The specialized command is then applied to the converter to either receive information, in the case of a sensor, or activate an actuator corresponding to the command. (See step 440).

As briefly discussed, the controller and the NDI device of the present invention are capable of operating in either a synchronous or asynchronous mode. In the synchronous mode, the controller provides a continuous synchronous clock signal. The synchronous clock signal is used by the NDI device of the present invention to clock in data from the bus controller and to clock data out to the controller. This allows the bus controller to pick any data rate between 0 bits/sec up to some maximum bit rate.

Figure 6:
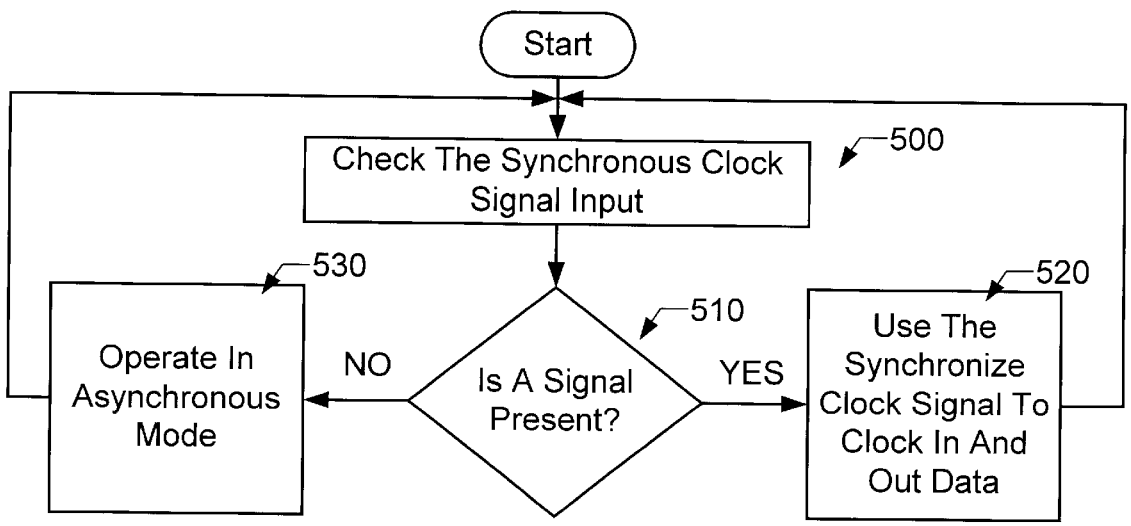
FIG. 6 is a block diagram of the operations performed to determine whether a controller is operating in either a synchronous or asynchronous mode according to one embodiment of the present invention.

The NDI device of the present invention can automatically detect whether the controller is operating in the synchronous or asynchronous mode. Specifically, with reference to FIGS. 3A, 3B, and 6, the NDI device of the present invention continuously checks the signal received on the second receiver 52 using a clock detector. (See step 500). If a synchronous clock signal is present, (see step 510), the NDI device of the present invention operates in the synchronous mode, (see step 520), and uses the synchronous clock signal from the controller to clock data in and clock data out. However, if the NDI device of the present invention does not detect a synchronous clock signal from the second receiver 52, (see step 510), the NDI device of the present invention operates in asynchronous mode. (See step 530).

Figure 7:
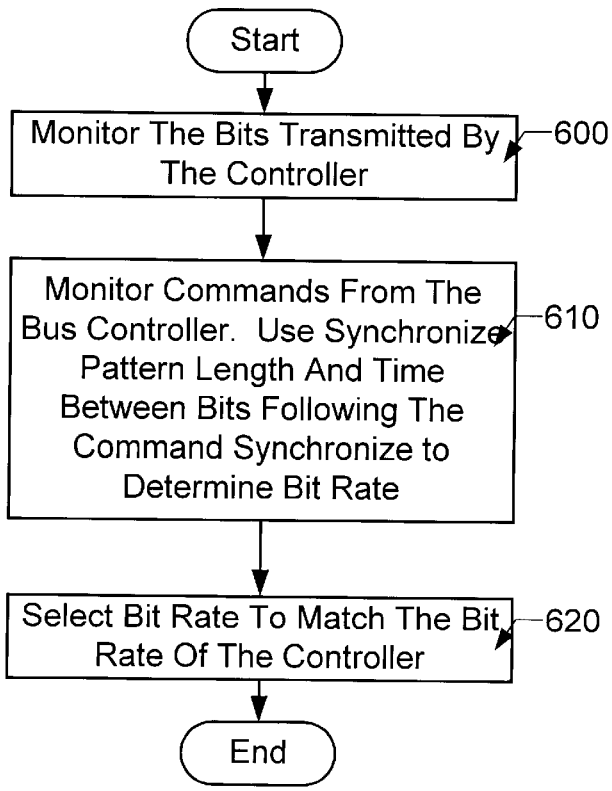
FIG. 7 is a block diagram of the operations performed to determine the bit rate at which a controller is transmitting commands and data according to one embodiment of the present invention.

As mentioned above, in asynchronous mode, the controller may operate at various bit rates. In light of this, in one embodiment, the NDI device of the present invention detects the bit rate at which the controller is operating. Specifically, with reference to FIG. 7, in this embodiment, after the NDI device of the present invention determines that the controller is operating in asynchronous mode, the NDI device of the present invention monitors the bits of the command and data transmitted by the controller. (See step 600). The NDI device determines the time between receipt of each bit using a bit rate detector. After a predetermined number of bits have been received having substantially the same time between transmissions, (see step 610), the NDI device of the present invention chooses and operates at the bit rate of the data being sent to the NDI device. (See step 620). Importantly, the ability of the NDI device to detect bit rate is advantageous for fast recovery when there are power glitches in the networked system, or where the controller has transitioned from synchronous to asynchronous mode. A second important advantage of the automatic synchronous clock detect and automatic bit rate detect features is that it allows a single type of NDI device to communicate on the network using different modes of network communication. Designer of the network system can choose the mode of network communication that is optimized for the particular application of the network system.

In one further embodiment, the bus controller can command the NDI device to receive and transmit data at a specific bit rate. The bus controller sends a change bit rate command followed by the bit rate the NDI devices is to change to. After that the DI device will receive data from and transmit data to the bus controller at the bit rate instructed by the bus controller. Further, the controller may send an example message at the new bit rate, and the NDI of the present invention will change to the new bit rate before real commands and data are sent.

Another advantage of the NDI device of the present is the ability of many data channels on many different NDI devices on a network bus to sample or convert analog data at substantially the same time when communicating to the bus controller in the synchronous or asynchronous modes. One method of synchronization of data sampling or conversion in the asynchronous mode is accomplished by having the rising edge of convert signal 84, (see FIG. 3B), go high at or very shortly after the changing center edge of the convert command from the bus controller. Some protocols call a convert command a trigger command. The ability of the protocol and NDI devices to take data or convert data simultaneously even in the asynchronous communication mode is called isochronous.

The second method of synchronization data sampling is by providing synchronized clock signals from each NDI device to each data channel associated with each NDI device. The clock signals are synchronized by the bus controller using the synchronize command, and the NDI devices synchronize in response to the command according to the timing in FIG. 9. That way all data channels using a clock signal that has a frequency that is a divided fraction of the synchronous bus clock will all be running nearly perfectly synchronously.

In addition to providing an interface with different types of A/D and D/A converters and different signal conditioning systems and operating in both synchronous and asynchronous mode, the NDI device of the present invention can also save overhead in the transmission of data across the network. Specifically, as illustrated in FIG. 3B, the NDI device of the present invention includes a data stack 88. In the case where the NDI device is connected to a sensor remote device, the data stack is an In Data Stack. The In Data Stack contains data received from the data channel. In this instance, the data stored in the In Data Stack can be read out by the controller either one word at a time, (i.e., one register at a time), or as a block of data, (i.e., multiple registers at a time). Reading a block of data from the data stack at a time saves network overhead.

Further, in instances in which the NDI device of the present invention is connected to an actuator remote device, the data stack is an Out Data Stack. In this case, the Out Data Stack contains data transmitted by the controller to be output to the actuator data channel. When a trigger command is sent to the actuator, the actuator performs a digital to analog conversion of the word at the top of the data stack, then NDI device will pop the stack, and transmit the new word at the top of the stack to the D/A. Data words can be written to the Out Data Stack individually by the controller or as a block of words. Writing a block of data to the Out Data Stack instead of one a time saves network overhead.

In addition to the advantages described above, the NDI device of the present invention also provides additional advantages. Specifically, in one embodiment, the NDI device of the present invention operates in conjunction with a protocol that allows data channels to communicate over a simple and high-speed, yet robust, digital multi-drop network. It must be understood that any applicable protocol could be used in conjunction with the NDI device of the present invention. However, described below is a particular protocol that provides several advantages when used in the networked system 30 illustrated in FIG. 1. One important advantage being that the simplicity of the protocol allows the NDI device to be implemented as a state machine, as opposed to a high-level processor.

Specifically, the protocol is designed to insure low-level communication control interface, (i.e., network controllers and NDI devices). The protocol makes possible the development of controller and network device interfaces that are highly miniaturized within the network. If the network controller and NDI devices are implemented in an Application Specific Integrated Circuit (ASIC) or FPGA working in conjunction with the protocol, the network controller and NDI device can respond quickly and efficiently allowing for maximized bus efficiency. If the bus controller or NDI device is implemented as an ASIC, the bus controller and NDI devices can be made very small.

The protocol of the present invention also has a low-overhead command structure. The protocol of the present invention does not use a fixed-length message. The length of the message varies depending on the command. This, in turn, permits the elimination of unnecessary data being transmitted if it is not needed to execute a command. In addition, the command set is minimal and straightforward thus allowing the user to easily pass data through the network bus with minimal manipulation.

As discussed, the NDI device of the present invention operates in conjunction with a protocol that has a fixed, low-level instruction set that, in turn, allows in some case for use of simplified controllers and network device interfaces on network devices. Specifically, the low level command set allows the NDI devices to be implemented as state machines instead of processors or micro-controllers. An example of how the low level command set works is given here. If the bus controller wants to read a data word from the memory of an NDI device it sends a command to the NDI called set pointer, then follows the command with the pointer value. The NDI decodes the command and sets its memory address pointer to be the value sent by the bus controller. The memory address pointer only needs to be a register that latches the value sent by the bus controller. Next, the bus controller will issue the read memory word command to the NDI device. The NDI device responds by accessing the memory word pointed to by its memory address pointer, and transmitting it to the bus controller. If the bus controller wants to read a block of data from the memory of the NDI it repeats the process multiple times.

If the command set is a high level command set, the above described read process, would be implemented as a read special memory block command. The NDI device would need to be able know where to set its pointer to access the special memory block, set its pointer, know how big the special memory block is, and then send the special memory block. This protocol offloads many of these tasks, such as keeping track of where special memory information is stored, and how big the block sizes of the special memory information is, and where to store special memory data, from the NDI device. These tasks are performed by the bus controller instead by stringing low level instructions like set memory pointer and read and write memory together.

As discussed, the NDI device of the present invention operates in conjunction with a protocol that has a fixed, low-level, and low overhead instruction set that, in turn increases the actual data rate on the network bus when used with smart sensors and actuator. Network traffic for networking sensors and actuators is different from regular computer network traffic. Computer networks need to transfer large data files or messages from one computer to another. Consequently they have checksums and block sizes associated with the messages to ensure robust and error free data transmission. These checksums and block sizes, or other overhead, associated with these computer network protocols is not a problem because the size of the overhead is small compared to the total message size. Network traffic for sensors and actuators is different because in many cases, most of the messages on the network are very small messages with only 16 bits of data. If a block size, checksum, or other unnecessary overhead is added to the small 16 bit data message, the checksums, blocksize, and other overhead can contain more bits than the actual 16 bit data message. This effectively reduces the bandwidth c he sensor and actuator network bus. The NDI devices of the present invention sol e this problem by using a message protocol that does not add any unnecessary overhead such as checksum and block size to short 16 bit messages. The only overhead added to these short 16 bit messages is a sync pattern to indicate the start of a message, a flag bit, and a parity bit. The parity bit is used to check for errors in the 16 bits message. The flag bit indicates if an error condition exists in the sending NDI rice or associated data channel.

The protocol of the present invention is typically transmitted in a Manchester encoded format, but may also be implemented in a Universal Asynchronous Receiver Transmitter (UART) format protocol, if needed, to communicate with other UART systems. For example, in one embodiment, the protocol uses an RS-485 based, multi-drop, Manchester encoded protocol referred to as Bi-Phase Sensor and System (BiSenSys). BiSenSys is an 18-bit high speed, highly efficient protocol for use in connecting remote devices and subsystems together on a digital bus structure that uses Manchester encoding. An example another protocol that uses Manchester coding is MIL-STD-1553. Specifically, each bit of the data is detectable by one detectable transition, (i.e., "0" is defined as low to high and "1" is defined as high to low). Further, each message consists of a sync pattern, a message body, and a parity flag. The BiSenSys transmission protocol can be operated in synchronous or asynchronous mode and the can be implemented to operate at any data rate from 1 Hz–10 MHz in the synchronous mode or at 1.25, 2.5, 5.0, and 10.0 megabits per second in asynchronous mode. Additionally, the protocol of the present invention may be implemented in a UART based protocol. This protocol is designed to operate at a 1.0 megabit per second data rate and uses a 9-bit message format and non-return-to-zero bit coding.

There are at least three types of data frames transmitted across the network bus, with the data frames differing between the BiSenSys protocol and the UART protocol. There are 3 types of BiSenSys data frames. The first type is a command frame. A command frame consists of a command sync pattern followed by 10 Manchester encoded address bits, followed by 7 Manchester encoded command op-code bits, and 1 Manchester encoded parity bit. The command sync consists of the one and a half bus bit periods high and one and a half bit periods low state on the bus.

The second type of frame is an argument frame. An argument frame begins with a data sync pattern which is followed by 16 Manchester encoded argument bits, one Manchester encoded flag bit, and finally one Manchester encoded parity bit. The data sync pattern consists of the one and a half bit periods low followed by one and a half bit periods high. The last type of BiSenSys frame is the data frame. Data frames begin with the data sync pattern, which is followed by 16 bits of Manchester encoded data, one Manchester encoded flat bit, and one Manchester encoded parity bit. The only difference between an argument frame and a data frame is that argument frames are transmitted by the bus controller data frames are transmitted by network devices. Arguments are only transmitted by the bus controller following certain commands. The commands that require an argument to follow them are defined in the RHAMIS/

BiSenSys protocol. If the bus clock is used in the BiSenSys synchronous mode, it is transmitted in quadrature to the Manchester encoded bit stream.

In the case of the UART protocol, the message format contains 3 or more 11-bit frames. Each message has three required frames per message with two additional optional frames per message depending on the command issued. The first bit in every frame is a start bit (set to 0), and the final bit of all frames is a stop bit (set to 1). The first frame in a message is an address frame for the UART protocol. It is in the form of: a start bit, an 8-bit address field, an address bit set to 1, and a stop bit. The second frame in a UART message is a command frame. A command frame consists of a start bit, a 7 bit command field, an unused bit, the address bit set to 0, and the stop bit. If argument frames belong in the UART message, they follow the command frame. They consist of a start bit followed by 8 argument bits, an address bit set to 0, and the stop bit. The last frame of a UART message is a checksum frame. It consists of a start bit, 8 bit checksum, which is the modulo 2 sum of the address, command, and data bits with no carry, an address bit set to 0, and a stop bit.

In addition to providing a protocol having a low-level instruction set that operates in either synchronous or asynchronous mode and different transmission protocols, the present invention also provides a method for assigning unique addresses to each data channel. As illustrated in FIG. 1, in a typical networked system 30, there will be numerous data channels connected to a plurality of different NDI devices, all of which use a common network bus for communication with the bus controller. Further, each of the network devices may have several data channels or several tasks that can be commanded by the NDI device. The protocol of the present invention provides three types of addresses for each data channel of a network device. Specifically, each data channel on each network device can be assigned an individual logical address, a global address, and if configured, a group mask.

The logical address is an address recognized by a single data channel on a network device or a single controllable task with a network device. A global address, on the other hand, is recognized by all of the data channels of all of all of the network devices, while a group address is recognized by a subset of all of the data channels of all of the network devices. Data channels are not assigned group addresses. They are assigned group masks. Each bit in the group mask corresponds to a group address. In this way a single 16-bit mask can be used to assign a data channel to 16 groups. For example if the $1^{st}$ and $3^{rd}$ bit of the group mask are set to 1, the data channel recognizes itself as belonging to groups 1 and 3. It will respond to command messages having a group address of either 1 or 3. These three different addresses are important as they allow the controller to either communicate with an individual data channel of one network device or a group of data channels, either in the same network device or in several network devices, or with all of the data channels of all network devices. Each of these addresses is described in detail below.

The determination of the logical and group addresses may be by any selected method. A preferred method is described in U.S. Provisional Patent Application Ser. No. 60/254,137 entitled: NETWORK CONTROLLER FOR DIGITALLY CONTROLLING REMOTE DEVICE VIA A COMMON BUS and filed on Dec. 8, 2000. This method uses the Universal Unique Identifier (UUID) associated with each network device. The UUID code is an 80-bit code that is unique to every network device and is based on the location and date the device was manufactured.

With reference to FIG. 3A, the UUID for network device of the present invention are typically stored in the NDI device's memory device 66. During the determination of the logical and group addresses, the controller sends various commands to the NDI devices of the present invention commanding them to access their respective memory device, analyze the individual bits of the UUID and either respond or remain silent based on whether certain bits are 1 or 0. This allows the bus controller to discover the UUID of every network device, one network device at a time. Immediately after finding the UUID of a network device, the bus controller will assign logical addresses and group masks to every data channel on that network device.

FIG. 8 is a flow chart of the steps taken by a network device using an NDI device, under control of the bus controller, to uniquely identify itself to the bus controller. To begin a Device Inventory session NDI devices are enabled using the Device Inventory Enable command. This puts the NDI in the Device Inventory mode. (See step 700). If address "0" (the reserved global address for all devices) is specified in the address field, every network device on the bus will put itself into the Device Inventory mode. If a currently assigned logical address is specified in the address field, that network device will put itself into the Device Inventory mode. If a currently assigned group address is specified in the address field, all network devices belonging to that group will put themselves into the Device Inventory mode.

Various function codes in the Device Inventory command are used during the UUID word search. The Device Inventory command with the New UUID Word Search function code sets all Device Inventory session enabled devices into the UUID Word Search mode. (See step 705). Network devices on the bus will not compete in a UUID Word Search unless they are in the UUID Word Search mode. Immediately after being commanded into the Word Search Mode, the NDI device automatically proceeds by loading the least significant bit of the UUID into a first register and a "1" into a second register. (See step 710). When NDI devices are in the UUID Word Search Mode they will respond to the two UUID Bit Competition function codes.

The Master Controller will issue the Device Inventory command with the UUID Bit Competition, No Dropout function code. All NDI devices will make a decision based on this command. (See step 720). The NDI device will proceed to step 730 and make a decision bases on its bit in register 1. If this bit is a "1," (see step 730), the network device will remain quiet. If this bit is a "0," the network device will transmit a UUID pulse. (See step 740). The network device will then move the evaluated bit (either a "1" or a "0") into bit register 2, access its next UUID bit and load it into bit register 1. (See step 760).

The Master Controller will listen for UUID pulses transmitted on the bus. When the Master Controller hears a UUID pulse it knows at least 1 network device has a "0" for its current UUID bit. If the Master Controller hears at least one UUID pulse, the next command it will issue is the Device Inventory command with the UUID Bit Competition, 1's Dropout function code. The NDI device will have to interpret the command and make a decision. (See step 720). When a network device hears this command and code, it will look at its UUID bit in register 2. (See step 780). If this bit is a "1", the network device will exit the current UUID Bit Competition mode and quit competing in the UUID Word Search. If the bit in register 2 is a "0", the network device will look at the bit in register 1. (See step 730). If it is a "0", the network device will transmit a UUID pulse. (See step 740). If this bit is a "1", the network device will remain quiet. The network device will then move the bit in register 1 into bit register 2, access its next UUID bit and load it into bit register 1. (See step 780).

If the Master Controller does not hear any UUID pulse on the bus, the Master Controller will know that all network devices still in UUID Word Search mode have a "1" in bit register 2. In response to this, the next command the Master Controller will issue is the Device Inventory command with the UUID Bit Competition, No Dropout function code. When a network device receives this command it will remain in the competition without regard to what is in its registers. In response to the command all devices in the competition will look at bit register 1. (See step 730). If it is a "0", the network device will transmit a UUID pulse. (See step 740). If it is a "1", the network device will remain quiet. The network device will move the bit in register 1 into bit register 2, access its next UUID bit and load it into bit register 1. (See step 760).

The UUID Bit Competition described in this section is repeated for all 80 UUID bits. The Master Controller will have to issue a combined total of 81 UUID Bit Competition function codes. (See step 750). The Master Controller must issue the 81'st UUID Bit Competition function code so that the last network devices on the bus can resolve who had the winning last bit.

After the Device Inventory command with the UUID Bit Competition function codes has been issued for a combined total of 81 times there will be only one network device left in UUID Word Search mode. This network device is the winner. (See step 770). This network device has now been uniquely identified to the bus controller and will respond with the contents of a special memory location. (See step 780). The high byte of the special memory location will hold the protocol revision number, and the low byte will be the number of data channels on the network device. The winning network device and the bus controller will know the network device has won by winning all 81-bit competitions.

When the winning device has received the 81$^{st}$ UUID bit competition function code, the device will respond with a Bi-Phase compliant data field containing the protocol version number and the number of channels the device has stored in its memory. (See step 780). The bus controller may use this information to determine logical address channel assignment in the winning device. The winning network device will unprotect its logical address and group mask memory locations. (See step 790). The bus controller will assign logical addresses and group masks immediately following. (See step 800). If the data channel includes a plurality of the channels, the Master Controller will assign logical addresses and group masks to each channel. (See step 810). After the logical addresses and group masks have been assigned, the network device will exit the device inventory mode. The bus controller will repeat the UUID word searches until all network devices have been discovered, and a logical address and group mask assigned to every channel. The bus controller knows it has discovered all devices when the UUID if discovers in the bus is all 1's. No network device will ever have a UUID of all 1's.

As described above, each channel for each network device is provided with a logical address that uniquely identifies the data channel. Further, there are group addresses that address a number of data channels, and a global address that addresses all channels of all network devices. The global address is used for the exchange of global data and commands. The group address is an address that is recognized by multiple data channels of the network devices. Group addresses cause one or more data channels to respond to the same command at the same time. It is possible to have only one data channel assigned to a group address. Associated with the group address is a group mask stored in the address decoder 100. The group mask is a 16-bit word, where each bit set to 1 represents the groups that the data channel belongs.

As an example, in one embodiment, the global address is assigned 0000hex. In this embodiment, if the address 0000hex is transmitted, all of the NDI devices will follow the command. This is typically used for resetting the system or testing the system. Further, in one embodiment, the group addresses are selected in the range of 0001hex to 000fhex. In this embodiment, when an address in this range is received by a NDI device, it will compare the group address with the group mask stored in the address decoder register 100. If the bit in the group mask corresponding to the group address is set, the NDI device data channel of the present invention will interpret and follow the command associated with the group address. For example, if the group mask stored in the device inventory register is 100000001100bin, the NDI device belongs to group addresses 000fhex, 0003hex, and 0002hex.

The group address scheme is designed to permit the user to set up time deterministic triggers for groups of sensors or actuators at various sample rates. Table 1 illustrates a group of sensors having different sample rates and their group assignments, and Table 2 the sequence for polling the devices. As can be seen from these tables, the data channels can be grouped together such that they may be triggered simultaneously but at different sample rates.

TABLE 1

| Logical Address | Device | Sample Rate (Samples/sec) | Group Address |
|---|---|---|---|
| 16 | Temperature 1 | 125 | 1 |
| 17 | Pressure 1 | 250 | 1, 2 |
| 18 | Strain 1 | 500 | 1, 2, 3 |
| 19 | Strain 2 | 500 | 1, 2, 3 |
| 20 | Strain 3 | 500 | 1, 2, 3 |
| 21 | Strain 4 | 500 | 1, 2, 3 |
| 22 | Accelerometer 1 | 1000 | 1, 2, 3, 4 |
| 23 | Accelerometer 2 | 1000 | 1, 2, 3, 4 |
| 24 | Accelerometer 3 | 1000 | 1, 2, 3, 4 |
| 25 | Accelerometer 4 | 1000 | 1, 2, 3, 4 |

TABLE 2

| Command Execution Time | Action |
|---|---|
| 0 | Issue Trigger Command to Address 1 Poll Addresses 16 through 25 |
| 1 msec | Issue Trigger Command to Address 4 Poll Addresses 22 through 25 |
| 1 msec | Issue Trigger Command to Address 3 Poll Addresses 18 through 25 |
| 1 msec | Issue Trigger Command to Address 4 Poll Addresses 22 through 25 |
| 1 msec | Issue Trigger Command to Address 2 Poll Addresses 17 through 25 |
| 1 msec | Issue Trigger Command to Address 4 Poll Addresses 22 through 25 |
| 1 msec | Issue Trigger Command to Address 3 Poll Addresses 18 through 25 |
| 1 msec | Issue Trigger Command to Address 4 Poll Addresses 22 through 25 |
| 1 msec | Restart Sequence |

With regard to the group addresses, if the controller sends out a group address, the address decoder 100 and a command decoder 102 of the present invention will decode the address portion of the command and will compare the group address to group mask stored in itself. If the group mask indicates that the network device is subject to the group address, the proper data channel will perform the command associated with the group address on the network device.

Described above, the addressing methods used with the protocol allows the controller to send commands and data to either one or several of the network devices, with the different forms of data transmitted depending on whether BiSenSys or UART is used. Provided below are the commands typically used to communicate across the network bus. As stated previously, the protocol of the present invention is designed to maximize efficiency so that the commands and response messages can vary in length depending on the data quantity required to execute any command. In order to accomplish this, the protocol of the present invention provides three levels of utility. These commands are listed in Table 3.

TABLE 3

| Command (hex) | Command Description |
| --- | --- |
| Service Commands | |
| 00 | No Op |
| 01 | Built in Test |
| 02 | Reset |
| 03 | Read Status Register |
| 04 | Device Inventory Enable |
| 05 | Device Inventory |
| 06 | Control Pass |
| 07 | Wake |
| 08 | Sleep |
| 09 | E-Calibration |
| 0A | Z-Calibration |
| 0B | Synchronize |
| 0C | Baud Select |
| 0D–0F | Reserved |
| Data Commands | |
| 20 | Trigger |
| 21 | Trigger and Read |
| 22 | Read In-Data Register Word |
| 23 | Read In-Data Stack Word |
| 24 | Read In-Data Stack Block |
| 25 | Query In-Data/Out-Data Stack Depth |
| 26 | Write Out-Data Stack Word |
| 27 | Write Out-Data Stack Word/Acquire to In-Data Register |
| 28 | Write Out-Data Stack Block |
| 29–2F | Reserved |
| Memory Commands | |
| 30 | Set Memory Pointer |
| 31 | Read Memory Word with Current Pointer |
| 32 | Read Memory Block with Current Pointer |
| 33 | Write Memory Word with Current Pointer |
| 34 | Write Memory Block with Current Pointer |
| 35 | Read Memory Word with Passed Pointer |
| 36 | Read Memory Block with Passed Pointer |
| 37 | Write Memory Word with Passed Pointer |
| 38 | Write Memory Block with Passed Pointer |
| 39–7F | Reserved |

One level of commands is the service commands. Service commands are intended for network housekeeping, network device interface status, power control, calibration, and bus master arbitration. These commands are briefly described below. For example, the No Op command instructs the NDI device of the present invention to take no action. The No Op command is typically used in initialization of operation or by the master or network controller, (see FIG. 1), to maintain bus control.

The Built-In-Test (BIT), E-Calibration, and Z-Calibration commands are used to perform self-test on the NDI devices connected to the network bus. For example, the BIT command commands the NDI device to perform a check of internal circuitry. The E-Calibration command forces an excitation calibration, where the input from a sensor network device is replaced with a reference voltage, and the NDI device takes a reading to determine the calibration of the NDI device at the reference voltage. Similarly, the Z-Calibration command initiates a zero calibration measurement, where the input for a sensor data channel is shorted. The NDI device takes a reading to determine the offset of the data channel.

The protocol also includes two types of reset commands, namely Reset and Synchronize. The Reset command initializes all the network device interfaces of the present invention that are connected to the network bus to a power-up state. This Reset command is typically used by the controller to reset the bus and network devices when necessary and regain control of the network bus.

The Synchronize command is an important command for establishing and maintaining synchronization between several NDI devices. Specifically, as discussed previously, some A/D and D/A converters require a continuous clock signal that is different from the synchronous clock signal provided by the controller. This clock signal is provided by a divider that divides down either the synchronous bus clock signal or the clock signal from a local oscillator. This divided clock signal is used by the converter to convert data. Although the divider provides the proper clock frequency needed by the converter, the presence of these different dividers on the different NDI devices can cause the converter on one NDI device to not be synchronized with a converter on another NDI device. Specifically, all of the converters may be operating at the same frequency, but the dividers may be out of phase.

In light of this, the Synchronize command synchronizes the divided clock signal among a plurality of NDI devices. Specifically, with reference to FIG. 9, when the divider is using the synchronous clock signal and the Synchronize command is issued, the NDI device will control its clock divider to reset and restart producing the clock signal. All of the NDI devices will do the same reset and restart of their clock dividers at the same time according to the group or global address used in the synchronize command.

Figure 11A:
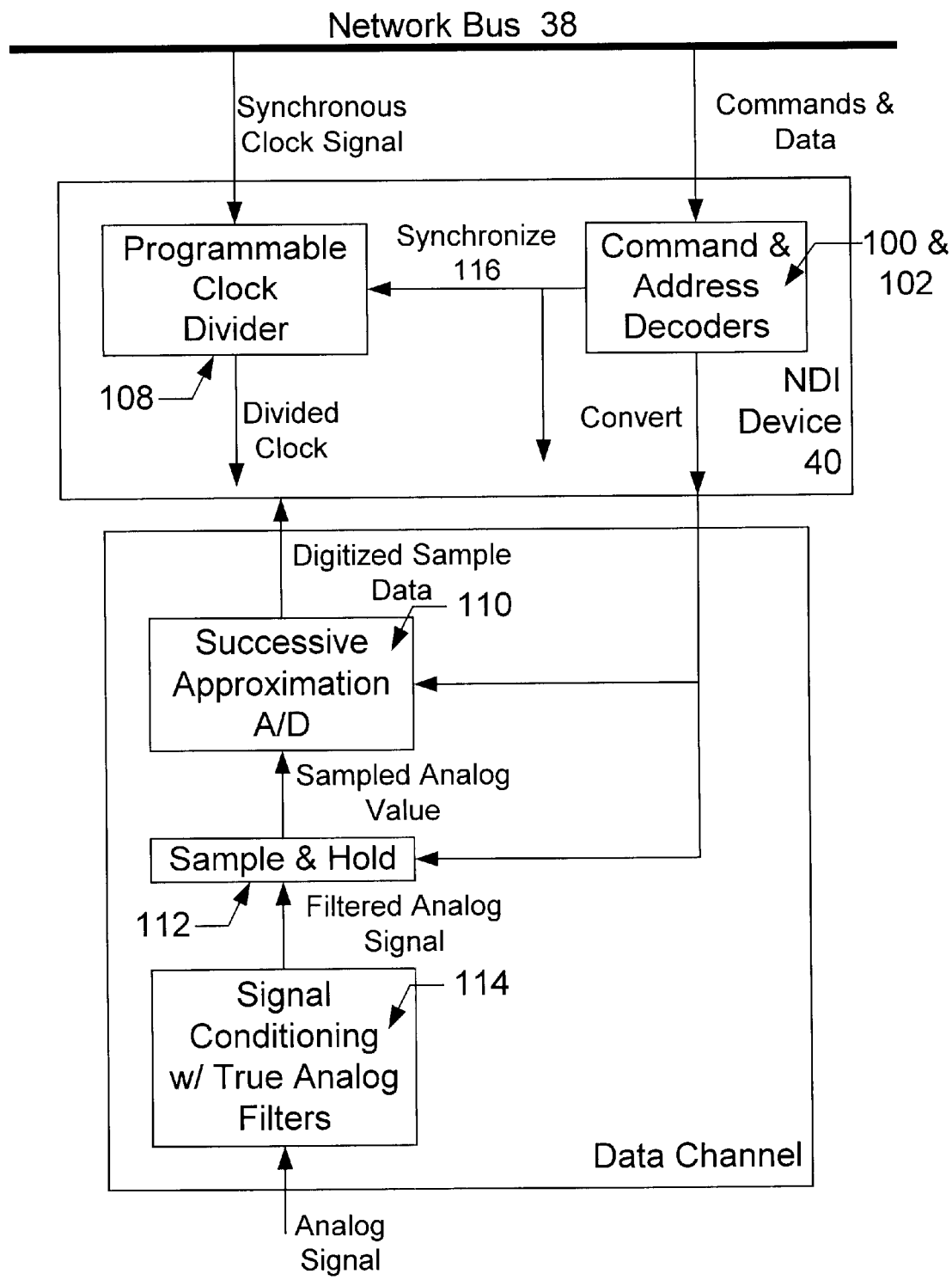
FIG. 11A is a block diagram of the connection of the NDI device of the present invention to a successive approximation A/D that uses a convert signal from the NDI device to acquire data with precise timing, according to one embodiment of the present invention.
Figure 11B:
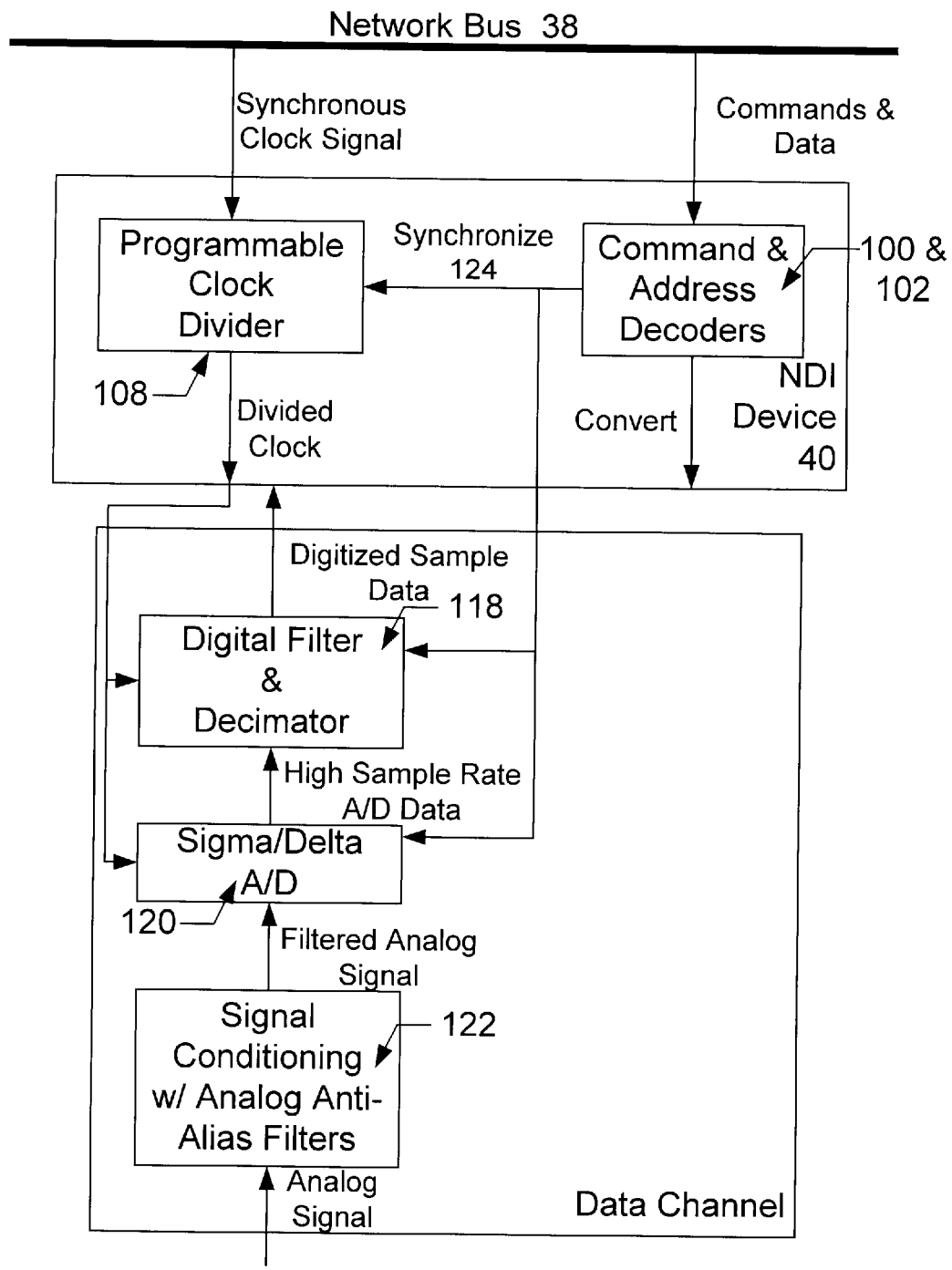
FIG. 11B is a block diagram of the connection of the NDI device of the present invention to a digital filter and decimator and a sigma/delta A/D that uses the synchronized divided clock and possibly the synchronize signal to acquire data with precise timing, according to one embodiment of the present invention.
Figure 11C:
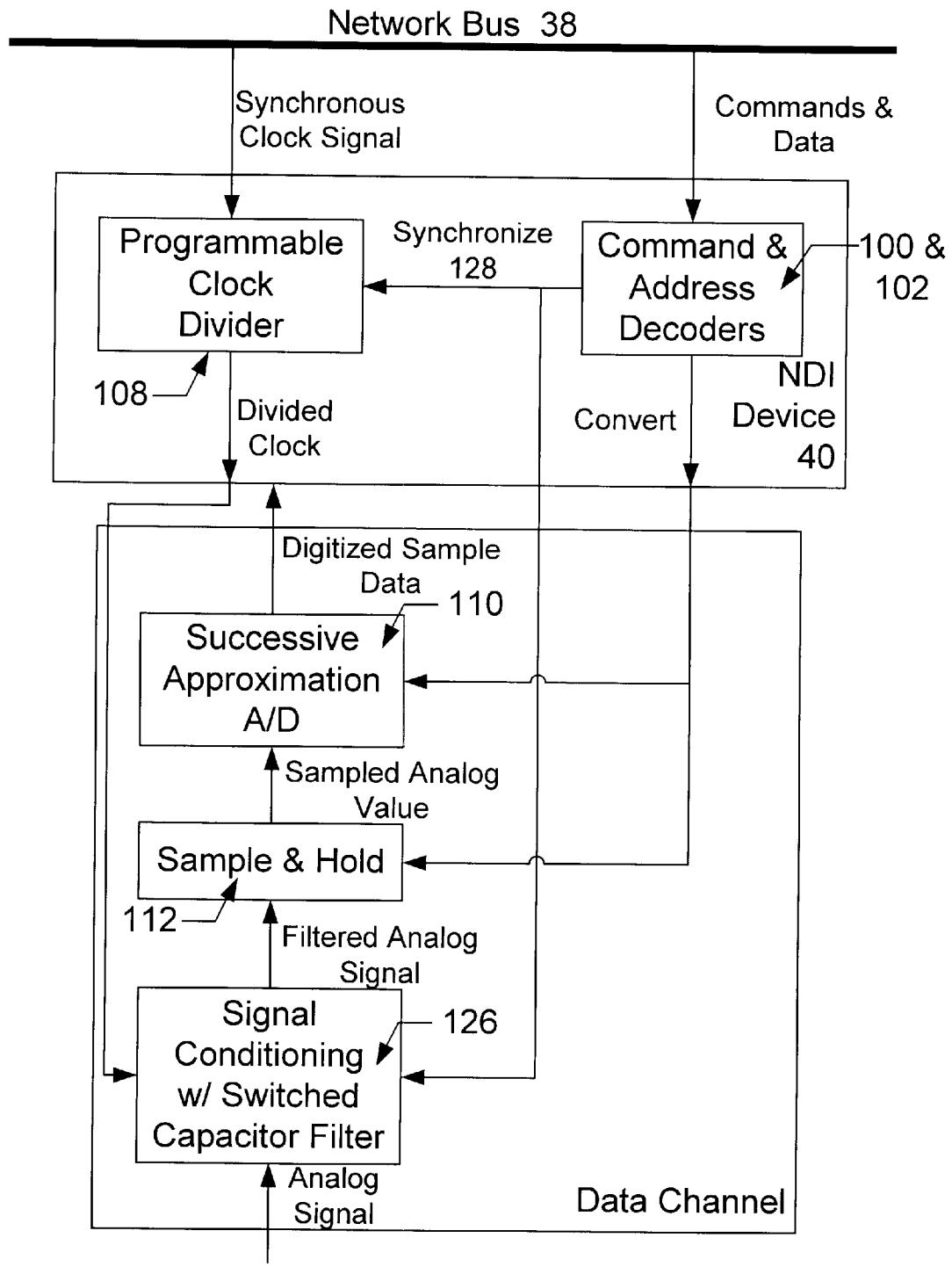
FIG. 11C is a block diagram of the connection of the NDI device of the present invention to a successive approximation A/D and signal conditioning with switched capacitor filters, where the switched capacitor filters require both the convert and divided clock signals to acquire data with precise timing, according to one embodiment of the present invention.

FIGS. 11a, 11b, and 11c illustrate alternative embodiments of how the NDI device of the present invention can be attached to and control different data channels. Some data channels will only need the convert signal from the NDI device to acquire data with precise timing as in FIG. 11A. Some data channels will need only the synchronized divided clock and possibly the synchronize signal to acquire data with precise timing in FIG. 11B. Some data channels, such as in FIG. 11C may require both the convert and divided clock signals to acquire data with precise timing.

With reference to FIGS. 11A–11C, the use of the Synchronize command is illustrated with respect to causing switched capacitor filters 126, sigma/delta A/D converters 120, or digital filters 118, etc. in the data channels among different network devices to all operate synchronously. If the clock divider is dividing the local oscillator to produce the clock signal, the divider will reset and restart at the center edge of the parity bit of the synchronize command. This will cause the clock dividers among a plurality of NDI devices to synchronize together. It is realized that the clocks will drift out of phase over time however because of variations in the frequencies of the local oscillators. If the source for the clock divider is the bus clock, the clock dividers will synchronize according to the timing in FIG. 9, and the divided clocks will continue to run synchronously after that. The current embodiment of the NDI device provides the synchronize signal, 116, 124, and 128, to the data channels attached to it to reset or synchronize sigma/delta A/D converters 120, digital filters 118, or other devices.

With reference to Table 3, the protocol also includes Wake and Sleep commands. The Sleep command powers down certain portions of the network devices and the Wake command powers them up. Further, the protocol includes the Read Status Register command. This command provokes a read of the status register of the NDI device and provides information, such as whether the network device is busy, whether it supports certain commands, whether the controller requested to much or too little data from the data stack, whether message transmission errors have occurred, whether the memory is unprotected, etc.

The Control Pass command is used by the master and network controllers to establish which bus controller is in control of the bus, if there is more than one bus controller on the network bus. Further, the Baud Select command can be used by the controller to change the baud rate on the network bus when operating in the asynchronous mode.

The Device Inventory Enable command and the Device Inventory command were previously discussed in relation to the unique identification of every network device and the assignment of logical addresses and group masks to the data channels. The Device Inventory Enable command selects groups of network devices to be inventoried. The Device Inventory command is used to control most actions associated with identifying network devices and assigning logical addresses and group masks. The command is different in that the address field of the command is used to direct various device inventory functions within a device. For example, these functions include entering into a new Word Search competition and the actions associated with No Dropout and 1's Dropout. Further, the commands include reading from the memory of the device that won the Word Search and writing the logical addresses and group masks.

A second type of commands is data type commands. These commands are tailored for time-deterministic data acquisition and control. Network efficiency is maximized by permitting NDI devices to move one data point directly or more than one data point as defined-length block transfers. For example, the Trigger command is used by the controller to initiate an incoming data measurement in a sensor data channel or cause a data conversion to a physical quantity in an actuator data channel. With reference to FIG. 3B, each of the channels of the network device interface of the present invention includes an In-Data Register 89 and an In-Data Stack 88. When the Trigger command is received by the NDI device, the contents of the In-Data register are pushed to the top of its In-Data stack. It will then take a new reading from the data channel. When finished reading, the new reading will be in the In-Data register. The bus controller will normally read data from the in-data stack.

While acquiring data from the In-Data stack causes a latency of one or more sample in the sensor reading sent to the bus controller, this arrangement allows Read-in-data-stack commands to be issued to a sensor data channel immediately after a Trigger command. Read in-data stack commands read data from the in data stack. This, in turn, allows maximum use of the network bus bandwidth, which is important where sensor data channels have long conversion times. This also simplifies the Trigger and Read command set that the user must write because pauses do not need to be included before reading from the in-data stack.

The Read In-Data Register Word command permits reading data from the In-Data register immediately after it becomes available from the data channel. The bus controller must not try to read from this register before the data becomes valid. In the case where the network device is an actuator, the NDI device will command a data conversion on the value at the top of the Out Data Stack and then pop the Out Data stack. In the currently implemented embodiment of the NDI device, not shown here, there is not out-data stack in the NDI device. The data is sent from the bus controller to the NDI device and straight to the D/A converter or data channel without passing through a data stack. However the D/A or data channel connected to the NDI device has a register to hold the data which serves as an out-data stack with a size of one stack word.

As discussed, the Trigger and Read command is used to initiate a measurement cycle of a data channel and immediately transmit the results of the previous measurement on the network bus. In response to this command, the NDI device of the present invention simultaneously pushes the contents of the In-Data register onto the In-Data stack, begins a new measurement cycle, and begins transmitting the contents of the top of the In-Data stack. The push to the In-Data stack will occur before and during the transmission of the data sync pattern of the command. In this way, the result of the previous measurement will be valid and in the data stack when the transmitter section of the NDI device accesses it for transmission. The data sample is then transmitted across the network bus while a new measurement is taken.

With regard to the read commands, the Read In-Data Register Word command initiates a read directly from the In-Data register. The NDI device places the contents of the In-Data register on the network bus. The Read In-Data Stack Word command is used to read a data word from the top of the In-Data stack. In this instance, the NDI device of the present invention responds by outputting the newest data word from the data stack onto the network bus and older data is shifted to the top of the stack.

As illustrated in FIG. 3B, the data stack associated with each channel of the NDI device of the present invention includes several registers. The Query In-Data/Out-Data Stack Depth command is used to determine how many valid data words are on the In-Data or Out-Data stack. In this instance, the NDI device of the present invention keeps track of the number of valid data words in its stack depth register. The value of this register is transmitted to the bus controller by the NDI device when commanded by the bus controller.

The Write Out-Data Stack Word command directs the NDI device of the present invention to write a data word to the top of the Out-Data stack. Further, the Write Out-Data Stack Word/Acquire To In-Data Register command further directs the NDI device to simultaneously acquire data from the data channel and put it into the In-Data register. If the output signal to the data channel is connected to input to the NDI from the data channel, this command can be used to echo data sent to the actuator back to the bus controller. Similar to the Write Out-Data Stack Word, the Write Out-Data Stack Block command directs the NDI device to write multiple data words to the Out-Data stack.

In addition to the service and data type commands, the protocol of the present invention also includes memory commands. These commands permit access to specific defined memory locations or functions to which data can be written or read. This permits random access data blocks to be efficiently transferred between one system and another with little overhead. It also permits direct memory access and/or one or more data buffers blocks to be moved.

For example, the command Set Memory Pointer sets the memory address pointer within the NDI device. The Read Memory Word With Current Pointer command is used to read a single word from memory pointed at by the memory address pointer. The Read Memory Block With Current Pointer is used to read a block of data words from memory starting at the memory word pointed to by the current value of memory address pointer. An argument passed with the command to the NDI device instructs the NDI device as to how many data words are to be read. After each memory word is sent to the bus controller by the NDI device, the memory pointer is automatically incremented by one. Then the next memory word is transmitted. This process is repeated until the number of memory words requested by the bus controller has been transmitted.

The protocol of the present invention also includes write memory commands. Specifically, the Write Memory Word With Current Pointer command writes a single word into memory. The NDI device will write the argument accompanying the command into memory at the location currently pointed to by the memory address pointer. The Write Memory Block With Current Pointer command, on the other hand, writes a block of data words into memory. The NDI device of the present invention will write the arguments accompanying the command into memory beginning at the location currently pointed to by the memory address pointer. After each word is written, the memory address pointer is incremented by one. This process is repeated until all of the words have been written into the memory.

Similar to the commands just described, the protocol of the present invention includes commands for reading and writing words and blocks of data from and into memory using a pointer sent by the controller along with the command. These commands operate similar to those above, except the pointer is provided as an argument following the command. These commands are: Read Memory Word With Passed Pointer, Read Memory Block With Passed Pointer, Write Memory Word With Passed Pointer, and Write Memory Block With Passed Pointer.

Figure 10:
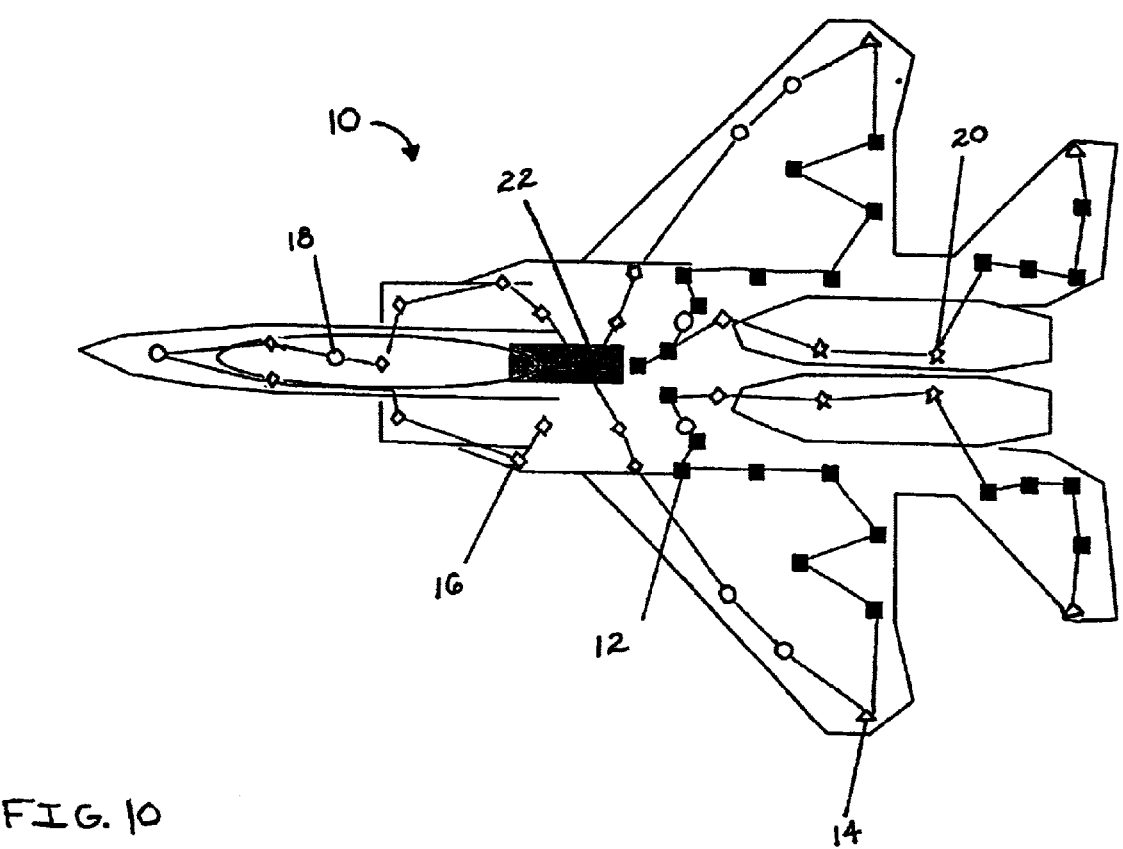
FIG. 10 is a schematic diagram of an electrical network system according to one embodiment of the present invention implemented in an aircraft.

As stated previously, the NDI device of the present invention provides for digital communication of commands and data between a controller and various network devices across a network bus. With regard to FIG. 10, a networked system implementing the NDI device of the present invention is illustrated in an aircraft 10. In this embodiment, a network is used to monitor various critical structural locations. Located on the aircraft are network devices to measure strains 12, such as wing root, wing surface, tail root, tail cord and landing gear strains, and accelerations 14, such as wing tip and tail tip accelerations. Further, the network includes sensors 16 to monitor the pressure at various critical structural locations, such as critical belly pressures for sonic fatigue, as well as key corrosion locations 18 for radar, landing gear and leading edges, and engine casing temperatures 20. In this embodiment, all of the network devices are connected to a common bus, thereby eliminating excess wiring. Further, data and commands are transmitted digitally to reduce susceptibility to noise.

Additionally, the preferred protocol for the NDI devices uses Manchester encoding of network data bits to help allow miniaturization of the NDI devices. It must be understood that for any device to receive asynchronous serial data, it must be able to acquire the timing of the data sequence from the serial data stream. Normally, the receiver of the serial asynchronous data must have a local oscillator to cause its receiver to operate, and recover the timing information from the serial data. Once the timing information has been extracted, the asynchronous receiver is able to receive serial data at certain rates, plus or minus a certain deviation from these rates, given this local oscillator frequency. Manchester encoding of serial data causes a transition from high to low or low to high in the center of every bit. This makes it easy to extract the necessary timing information from the serial data stream. Because it is so easy to extract the timing information from the Manchester encoded serial data stream, a relatively large deviation from the expected data rate, based on the local oscillator can be tolerated. This tolerance to relatively large deviations from the expected data rates allows each NDI receiver to use a low accuracy local oscillator to receive the Manchester encoded data. Low accuracy local oscillators can be made extremely small. Current embodiments of adequate local oscillators are only about 1×1.5 millimeters. This aids in making miniature NDI devises.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of addressing groups of data channels that are each adapted to communicate with a bus controller via a common digital bus, the method comprising:

constructing an individual mask for each data channel, wherein the mask comprises a plurality of bits, wherein each bit of the mask represents a respective group to which the data channel may belong and has a first state indicating that the respective data channel is a member of the group and a second state indicating that the respective data channel is a nonmember of the group;

transferring each mask to its respective data channel; and thereafter transmitting a first message from the bus controller to the data channels, wherein the first message identifies group of data channels that are designated to process the first message;

determining, at each data channel, if the respective data channel is a member of the group identified in the first message by analyzing the mask associated with the respective data channel; and processing the first message only if the respective data channel is a member of the group identified in the first message.

2. A method according to claim 1 further comprising storing the mask at its respective data channel.

3. A method according to claim 1 wherein one of the data channels is a member of more than one group and wherein said constructing step constructs the mask associated with the data channel such that the bits of the mask associated with the groups which the data channel is a member of are set to a first state and all bits of the mask associated with groups that the data channel is not a member of are set to the second state.

4. A method according to claim 1 further comprising establishing a different logical address for each data channel such that each data channel is also individually addressable.

5. A method according to claim 1 further comprising establishing a global address for all data channels such that all data channels are addressable by using the global address.

6. A method according to claim 1, wherein if a data channel belongs to more than one group, said constructing step constructs the mask associated with the data channel such that the bits of the mask associated with the groups which the data channel is a member of are set to a first state.

7. A method according to claim 1, wherein the bus controller sends a first message to a first data channel twice as often as the bus controller sends the first message to a second data channel,
wherein the first data channel is a member of both a first and a second group of data channels and the second data channel is a member of only the second group of data channels,
wherein said constructing a mask step constructs an individual mask for both the first data channel and the second data channel,
wherein for the first data channel said processing element sets the bits of the mask associated with the first and second group to a first state indicating in the mask that the first data channel is a member of both the first and second groups,
wherein for the second data channel said processing element sets the bit of the mask associated with the second group to a first state indicating in the mask that the second data channel is a member of the second group and sets the bit of the mask associated with the first group to a second state indicating in the mask that the second data channel is not a member of the first group,
wherein the first message includes a command and a group address designating the group of data channels designated to process the command,
wherein said transmitting step transmits the first address to the data channels to command the data channels,
wherein at a first time, said transmitting step transmits a first message having a command and a group address, where the group address designates the first group of data channels to process the command, and
wherein at a second time, said transmitting step transmits a first message having a command and a group address, where the group address designates that both the first and second group of data channels to process the command.

8. A system for addressing groups of data channels adapted to communicate with a bus controller via a common digital bus, the system comprising:
a processing element for constructing an individual mask for each data channel, wherein the mask comprises a plurality of bits, wherein each bit of the mask represents a respective group to which the data channel may belong and has a first state indicating that the respective data channel is a member of the group and a second state indicating that the respective data channel is a nonmember of the group;
a transmitter connected to said processing element for transferring each mask to its respective data channel; and
a network device interface adapted to interconnect the bus controller with an associated data channel,
wherein said bus controller transmits a first message to the data channels, wherein the first message identifies a group of data channels that are designated to process the first message,
wherein a network device at each data channel determines if the respective data channel is a member of the group identified in the first message by analyzing the mask associated with the respective data channel with the group identified in the first message and processes the first message only if the respective data channel is a member of the group identified in the first message.

9. A system according to claim 8, wherein one of the data channels is a member of more than one group and, wherein said processing element constructs the mask associated with the data channel such that the bits of the mask associated with the groups which the data channel is a member of are set to a first state and all bits of the mask associated with groups that the data channel is not a member of are set to the second state.

10. A system according to claim 8, wherein said processing element establishes a different logical address for each data channel such that each data channel is also individually addressable.

11. A system according to claim 8, wherein said processing element establishes a global address for all data channels such that all channels are addressable by using the global address.

12. A system according to claim 8, wherein if a data channel belongs to more than one group, said processing element constructs the mask associated with the data channel such that the bits of the mask associated with the groups which the data channel is a member of are set to a first state.

13. A system according to claim 8, wherein the bus controller sends a first message to a first data channel in the group of data channels twice as often as the bus controller sends the first message to a second data channel,
wherein the first data channel is a member of both a first and a second group of data channels and the second data channel is a member of only the second group of data channels,
wherein said processing element constructs an individual mask for both the first data channel and the second data channel,
wherein for the first data channel said processing element sets the bits of the mask associated with the first and second groups to a first state indicating in the mask that the first data channel is a member of both the first and second groups,
wherein for the second data channel said processing element sets the bit of the mask associated with the second group to a first state indicating in the mask that the second data channel is a member of the second group and sets the bit of the mask associated with the first group to a second state indicating in the mask that the second data channel is not a member of the first group,
wherein the first message includes a command and a group address designating the group of data channels designated to process the command,
wherein said bus controller transmits the first address to the data channels to command the data channels,
wherein at a first time, said bus controller transmits a first message having a command and a group address, where the group address designates the first group of data channels to process the command, and
wherein at a second time, said bus controller transmits a first message having a command and a group address, where the group address designates that both the first and second group of data channels to process the command.

14. A system according to claim 8, wherein said processing element and transmitter are located in said bus controller.

15. A system according to claim 8, wherein the first message comprises a command and a group address and said network device interface comprises:

- a receiver for receiving the first from said bus controller
- an address decoder for analyzing the group address located in the first message to determine if the first message is addressed to the data channel associated with the network device interface, said address decoder including a the mask constructed by the processing element for the data channel where each bit of the mask represents a respective group to which the data channel may belong and has a first state indicating that the respective data channel is a member of the group and a second state indicating that the respective data channel is a nonmember of the group, wherein in response to the receipt of the first message, said address decoder compares the group address located in the first message with the mask associated with the data channel to determine whether the data channel is a member of the group designated by the group address located in the first message; and
- a device interface for providing the command located in the first message to the data channel associated with the network device if the address decoder determines that the data channel is a member of the group defined by the group address located in the first message.

16. A system according to claim 15 wherein said address decoder comprises a memory element for storing the mask.

17. A system according to claim 15 wherein the address decoder further includes a unique logical address for the associated data channel such that the associated data channel is also individually addressable.

* * * * *

UNITED STATES PATENT AND TRADEMARK OFFICE
CERTIFICATE OF CORRECTION

PATENT NO. : 6,708,239 B1
DATED : March 16, 2004
INVENTOR(S) : Ellerbrock et al.

It is certified that error appears in the above-identified patent and that said Letters Patent is hereby corrected as shown below:

<u>Column 33,</u>
Line 6, after "first" insert -- message --.

Signed and Sealed this

Twenty-ninth Day of June, 2004

JON W. DUDAS
*Acting Director of the United States Patent and Trademark Office*